(12) United States Patent
Moon et al.

(10) Patent No.: US 9,909,221 B2
(45) Date of Patent: Mar. 6, 2018

(54) CONTROLLABLE REDUCTIVE METHOD FOR SYNTHESIZING METAL-CONTAINING PARTICLES

(71) Applicant: UT-Battelle, LLC, Oak Ridge, TN (US)

(72) Inventors: Ji-Won Moon, Oak Ridge, TN (US); Hyunsung Jung, Nowon-gu (KR); Tommy Joe Phelps, Knoxville, TN (US); Chad E. Duty, Knoxville, TN (US); Ilia N. Ivanov, Knoxville, TN (US); Pooran Chandra Joshi, Knoxville, TN (US); Gerald Earle Jellison, Jr., Oak Ridge, TN (US); Beth Louise Armstrong, Clinton, TN (US); Sean Campbell Smith, Oak Ridge, TN (US); Adam Justin Rondinone, Knoxville, TN (US); Lonnie J. Love, Knoxville, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 415 days.

(21) Appl. No.: 14/205,589

(22) Filed: Mar. 12, 2014

(65) Prior Publication Data
US 2014/0262811 A1  Sep. 18, 2014

Related U.S. Application Data

(60) Provisional application No. 61/777,005, filed on Mar. 12, 2013.

(51) Int. Cl.
*C25B 1/00* (2006.01)
*C25B 1/21* (2006.01)
*C01B 19/00* (2006.01)

(52) U.S. Cl.
CPC .............. *C25B 1/00* (2013.01); *C01B 19/007* (2013.01); *C25B 1/21* (2013.01)

(58) Field of Classification Search
CPC ................ C25B 1/00; C25B 1/21; C01G 9/08
USPC ......... 423/101; 205/494, 477, 547, 548, 538, 205/539, 543–545
See application file for complete search history.

(56) References Cited

U.S. PATENT DOCUMENTS

| 6,444,453 | B1 | 9/2002 | Lauf et al. | |
|---|---|---|---|---|
| 7,060,473 | B2* | 6/2006 | Phelps | C01G 1/02 423/593.1 |
| 8,349,221 | B2 | 1/2013 | Kawamoto et al. | |
| 8,759,053 | B2* | 6/2014 | Phelps | C12P 3/00 252/518.1 |
| 9,127,295 | B2* | 9/2015 | Rondinone | B82Y 5/00 |
| 2002/0187889 | A1* | 12/2002 | Lauf | C01G 1/02 501/1 |
| 2005/0074380 | A1* | 4/2005 | Boren | B01J 19/006 423/1 |
| 2009/0013829 | A1* | 1/2009 | Harris | C22B 3/10 75/710 |
| 2010/0086454 | A1* | 4/2010 | Cooke | C01G 23/047 423/82 |
| 2010/0184179 | A1 | 7/2010 | Rondinone et al. | |
| 2010/0330367 | A1 | 12/2010 | Phelps et al. | |

FOREIGN PATENT DOCUMENTS

WO  2012030642 A2  3/2012
WO  WO 2012/138480 A2  10/2012

OTHER PUBLICATIONS

Peters, Ernest, Direct leaching of sulfides: chemistry and applications Metallurgical Transactions B, vol. 7B, Dec. 1976, pp. 505-517.*
Swift, et al., "Precipitation of sulfides from homogeneous solutions by thioacetamide" ACS, vol. 28, No. 2, Feb. 1956, pp. 146-153.*
Wei, et al., "Particulate pyrite formation . . . composition" Colloids and Surfaces, A: Physicochemical and Engineering Aspects 118(1996) pp. 51-61.*
International Search Report and Written Opinion dated Aug. 7, 2014 received from the Russian Patent Office from related Application No. PCT/US2014/023898.
Dameron C.T. et al., "Biosynthesis of Cadmium Sulphide Quantum Semiconductor Crystallites", Nature 338:596-597 (Apr. 13, 1989).

(Continued)

*Primary Examiner* — Steven Bos
(74) *Attorney, Agent, or Firm* — Scully Scott Murphy & Presser

(57) ABSTRACT

The invention is directed to a method for producing metal-containing particles, the method comprising subjecting an aqueous solution comprising a metal salt, $E_h$ lowering reducing agent, pH adjusting agent, and water to conditions that maintain the $E_h$ value of the solution within the bounds of an $E_h$-pH stability field corresponding to the composition of the metal-containing particles to be produced, and producing said metal-containing particles in said aqueous solution at a selected $E_h$ value within the bounds of said $E_h$-pH stability field. The invention is also directed to the resulting metal-containing particles as well as devices in which they are incorporated.

14 Claims, 7 Drawing Sheets

(56) References Cited

OTHER PUBLICATIONS

Smith P.R. et al., "Photophysical and Photochemical Characterisation of Bacterial Semiconductor Cadminum Sulfide Particles", J. Chem. Soc., Faraday Trans. 94(9):1235-1241 (1998).
Talam S. et al., "Synthesis, Characterization, and Spectroscopic Properties of ZnO Nanoparticles", International Scholarly Research Network, ISRN Nanotechnology 2012, Article ID 372505 (6 pages) (2012).

* cited by examiner

FIGS. 1(a)-(e)

CONTROLLABLE REDUCTIVE METHOD FOR SYNTHESIZING METAL-CONTAINING PARTICLES

The present application claims benefit of U.S. Provisional Application No. 61/777,005, filed on Mar. 12, 2013, all of the contents of which are incorporated herein by reference.

This invention was made with government support under Prime Contract No. DE-AC05-00OR22725 awarded by the U.S. Department of Energy. The government has certain rights in the invention.

FIELD OF THE INVENTION

The present invention relates to the field of inorganic particles, and more particularly, to such particles having a metal chalcogenide, metal pnictide, or metal oxide composition.

BACKGROUND OF THE INVENTION

Nanoparticles having metal-containing non-oxide compositions (i.e., "semiconductor" or "quantum dot" nanoparticles) are increasingly being used in numerous emerging applications. Some of these applications include electronics (e.g., transistors and diode lasers), LED displays, photovoltaics (e.g., solar cells), and medical imaging. Quantum dot nanoparticles are also being investigated as powerful new computer processing elements (i.e., qubits). Semiconductor nanoparticles often possess a metal chalcogenide composition, such as CdSe and ZnS.

As a consequence of its small size, the electron band structure of a quantum dot differs significantly from that of the bulk material. In particular, significantly more of the atoms in the quantum dot are on or near the surface, in contrast to the bulk material in which most of the atoms are far enough removed from the surface so that a normal band structure predominates. Thus, the electronic and optical properties of a quantum dot are related to its size. In particular, photoluminescence is size dependent.

Several physical methods are known for synthesizing semiconductor nanoparticles. Some of the physical techniques include advanced epitaxial, ion implantation, and lithographic techniques. The physical techniques are generally useful for producing minute amounts of semiconductor nanoparticles with well-defined (i.e., tailor-made, and typically, uniform) morphological, electronic, magnetic, or photonic characteristics. The physical techniques are typically not useful for synthesizing semiconductor nanoparticles in commercially significant quantities (e.g., grams or kilograms). Several chemical processes are also known for the production of semiconductor nanoparticles. Some of these methods include arrested precipitation in solution, synthesis in structured media, high temperature pyrolysis, and sonochemical methods. For example, cadmium selenide can be synthesized by arrested precipitation in solution by reacting dialkylcadmium (i.e., $R_2Cd$) and trioctyiphosphine selenide (TOPSe) precursors in a solvent at elevated temperatures, i.e.,

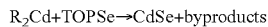

$$R_2Cd + TOPSe \rightarrow CdSe + byproducts$$

High temperature pyrolysis of semiconductor nanoparticles generally entails preparing an aerosol containing a mixture of volatile cadmium and selenium precursors, and then subjecting the aerosol to high temperatures (e.g., by carrying through a furnace) in the presence of an inert gas. Under these conditions, the precursors react to form the semiconductor nanoparticles (e.g., CdSe) and byproducts.

Although the chemical processes described above are generally capable of producing semiconductor nanoparticles in more significant quantities, the processes are generally energy intensive (e.g., by generally requiring heating and a post-annealing step), and hence, costly. Accordingly, commercially significant amounts of the resulting nanoparticles tend to be prohibitively expensive. Furthermore, these processes tend to be significantly limited with respect to control of the physical (e.g., size, shape, and crystalline form) and electronic or photonic characteristics of the resulting nanoparticles.

The microbial synthesis of semiconductor nanoparticles is known, e.g., P. R. Smith, et al., *J. Chem. Soc., Faraday Trans.*, 94(9), 1235-1241 (1998); C. T. Dameron, et al., *Nature*, 338: 596-7, (1989); and U.S. Application Pub. No. 2010/0330367. However, there are significant obstacles that prevent such microbially-mediated methods from being commercially viable. For example, current microbial methods are generally limited to the production of semiconductor nanoparticles on a research scale, i.e., an amount sufficient for elucidation by analytical methods. In addition, current microbial processes generally produce semiconductor nanoparticles adhered to cell membranes. Accordingly, numerous separation and washing steps are generally needed. Moreover, the range of particle compositions is limited by the reduction potential limitations of microbes as well as the allowable concentration limits of nutritive metal sources before reaching a level of toxicity to the microbes, i.e., "nutrient toxicity".

Similarly, particles having metal oxide compositions are increasingly being used in numerous emerging applications. Some of these include the use of magnetic nanoparticles (e.g., magnetite) in magnetic refrigeration or magnetic cooling circuits. Ferrite-type nanoparticles, in particular, are being intensely studied for their use in the fields of biomedicine, optics, and electronics. Other applications include photovoltaic materials, as used, for example, in solar cell devices.

Current methods for the production of nanoscale ferrites and other oxide ceramics generally entail calcining a precursor (e.g., a carbonate) at a high temperature, and then mechanical milling the calcined product to reduce the particle size. The process is energy and time intensive, generally difficult to control, and often requires several repetitions of the process before a final product is obtained.

Chemical processes, such as precipitation and sol-gel techniques, are also known for the production of metal oxide particles. However, these processes are typically more expensive than mechanical milling, and also generally highly limited with respect to size or shape control of the resulting particles. Often, a chemical or physical reduction step is needed to convert a metal oxide precursor to a metal oxide product. In addition, these processes often require a mechanical milling step to break up agglomerates formed during the reduction process.

The microbial synthesis of metal oxide nanoparticles is also known. See, for example, U.S. Pat. Nos. 6,444,453 and 7,060,473. However, there are significant problems in the microbial process as currently practiced. For example, there is the difficulty of obtaining pure nanoparticle product bereft of microbial matter. Therefore, numerous lysing or washing steps are often required. There is also the difficulty in controlling the particle size or the morphology of the nanoparticles, as well as limitation in microbial reduction potentials and nutrient toxicity.

SUMMARY OF THE INVENTION

The invention is foremost directed to a convenient controllable reductive (abiotic) method for the production of metal-containing particles, including metal non-oxide (e.g., metal chalcogen or pnictide) and metal oxide particles. The method described herein can advantageously produce a wide range of metal-containing particles with many of the benefits of microbial-based methods (e.g., lower cost and bulk production), but without many of the drawbacks of microbial-based methods, such as limitations in reduction potential and metal concentration limitations.

The invention accomplishes this by employing a controllable reductive process that in many ways mimics the ability of certain (fermentative) microbes to produce metal-containing particles from a metal-containing source, except that the process significantly broadens the range of possible compositions by permitting reduction potentials beyond the capabilities of microbes, and is also insensitive to precursor metal concentrations, thus providing a system better suited for bulk production. In particular embodiments, the method includes subjecting an aqueous solution that contains at least a metal-containing component, $E_h$-lowering reducing agent, pH adjusting agent, and water to conditions that maintain the $E_h$ value of the solution within the bounds of an $E_h$-pH stability field corresponding to the composition of the metal-containing particles to be produced, and producing the metal-containing particles in the aqueous solution at a selected $E_h$ value within the bounds of the $E_h$-pH stability field.

The invention is also directed to the metal-containing particles produced by the above-described method. The metal-containing particles produced herein possess any one or more of a diverse set of properties that make them useful. Some of the properties particularly considered herein include photovoltaic, photoluminescent, light-emitting, and thermoelectric properties. Such properties make these metal-containing particles useful in one or more end applications, e.g., in photovoltaic, light-emitting, and thermoelectric devices. Other applications include electrode materials, such as found in lithium ion batteries and fuel cells, as well as catalytic materials, as used in the treatment of diesel engine emissions.

In particular aspects, the metal-containing particles are useful as photoluminescent-tunable materials, which find particular use in photovoltaic devices. Other types of devices that can benefit from such tunable materials include light-emitting and laser diodes. Accordingly, the method and compositions of the invention can greatly advance several types of devices, including photovoltaic devices.

BRIEF DESCRIPTION OF THE DRAWINGS

FIGS. 1(a)-(e). Photograph showing ZnS nanoparticles synthesized under low organic carbon medium, Cys-S as reductant, and at varying pH of 11.7 (a), pH 10.8 (b), pH 8.1 (c), pH 6.1 (d) and pH 2.8 (e).

DETAILED DESCRIPTION OF THE INVENTION

Figures 2A, 2B:
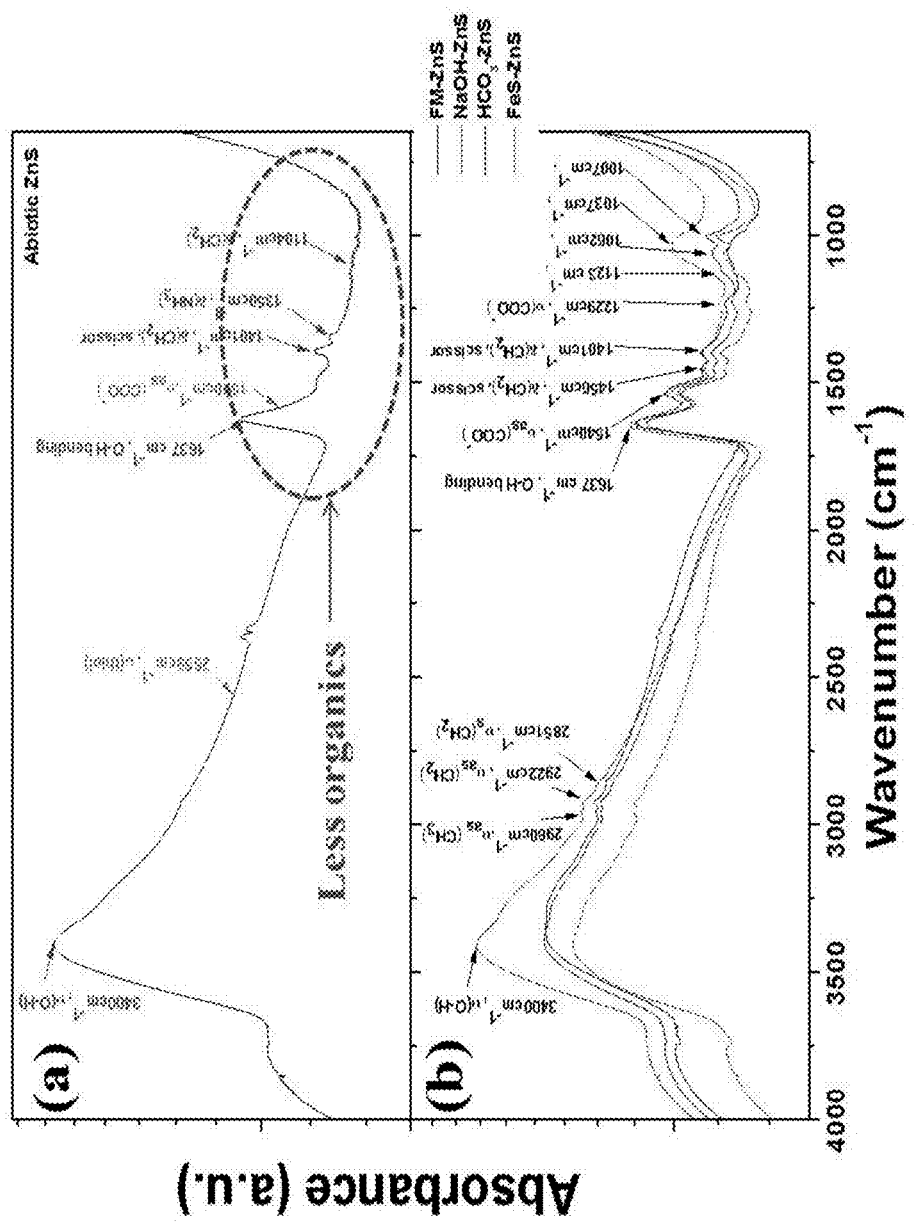
FIGS. 2(a), 2(b). FT-IR spectra of ZnS nanoparticles synthesized in different media: Cys-S (a low organic carbon medium) (a), and typical microbial media (b).

In the process described herein, an aqueous solution containing at least a metal-containing component, $E_h$-lowering reducing agent (i.e., "reducing agent"), pH adjusting agent, and water is subjected to conditions that maintain the $E_h$ value of the solution within the bounds of an $E_h$-pH stability field corresponding to the composition of the metal-containing particles to be produced. The $E_h$-pH stability fields for numerous compositions are publicly available from a variety of information sources.

The metal-containing particles are produced in the aqueous solution at a selected $E_h$ value within the bounds of the $E_h$-pH stability field. As further described below, the metal-containing aqueous solution may or may not further include a particle growth modifier or facilitator, such as a surfactant, chelator, or buffer, any one of which may or may not also be a surface-active agent, i.e., may or may not form coordinate bonds to surfaces of the metal-containing particles during particle growth.

The metal-containing particles can have any suitable particle size. The term "particle size", as used herein, refers to the length of at least one, two, or all of the dimensions of the particle. In the specific case of symmetric particles (e.g., spherical, spheroidal, or polyhedral shapes), the particle size corresponds to the diameter of the particles. The metal-containing particles generally possess a particle size of up to 10 microns. In some embodiments, the metal-containing particles have a size in the nanoscale regime, i.e., less than 1 micron (1 µm). In different embodiments, the metal-containing particles have a size of precisely, about, at least, above, up to, or less than, for example, 1 nm, 2 nm, 3 nm, 4 nm, 5 nm, 10 nm, 12 nm, 15 nm, 20 nm, 25 nm, 30 nm, 40 nm, 50 nm, 100 nm, 150 nm, 200 nm, 250 nm, 300 nm, 400 nm, 500 nm, 600 nm, 700 nm, 800 nm, 900 nm, 1 µm, 2 µm, 5 µm, or 10 µm, or a size within a range bounded by any two of the foregoing exemplary particle sizes (e.g., 1-10 nm, 2-10 nm, 1-20 nm, 2-20 nm, 3-20 nm, 1-50 nm, 2-50 nm, 5-50 nm, 10-50 nm, 1-100 nm, 5-100 nm, 10-100 nm, 20-100 nm, 1-500 nm, 10-500 nm, 50-500 nm, 1-1000 nm, 10-1000 nm, or 50-1000 nm). In some embodiments, the particles are fairly disperse in size (e.g., having a size variation of 20%, 30%, 40%, 50%, or greater from a median or mean size). In other embodiments, the particles are fairly monodisperse in size (e.g., having a size variation of or less than 50%, 40%, 30%, 20%, 10%, 5%, 2%, or 1% from a median or mean size).

The metal-containing particles can also have any suitable morphology. Some examples of possible shapes include amorphous, fibrous, tubular, cylindrical, rod, needle, spherical, ovoidal, pyramidal, cuboidal, rectangular, dodecahedral, octahedral, plate, and tetrahedral. In some embodiments, the metal-containing particles are equiaxed euhedral crystals (i.e., typically cubes, octahedra, and modifications thereof). By the abiotic process described herein, the metal salt may be reduced to an amorphous, semicrystalline, or crystalline final product. In some embodiments, the abiotic process described herein can be used to transform precursor particles of an amorphous phase into particles of a crystalline phase.

In some embodiments, the metal-containing particles are nanowires. The nanowires can, in some instances, be constructed of nanoparticles connected in a linear manner (i.e., as in a string of beads), wherein the nanowire may be straight or curved. The nanowires possess two dimensions in the nanoscale with the remaining dimension set in at least the microscale (e.g., at least 1 micron and up to 100 microns) or in the macroscale (e.g., over 100 microns, and up to 500 microns, 1 mm, 2 mm, or 5 mm).

The metal-containing component in the aqueous solution can be any one or more metal-containing compounds or materials that are soluble in the aqueous solution and which contain the metal in a cationic (i.e., non-elemental) state. A portion or all of the cationic metal species of the metal salt may be reducible by the reducing agent at a selected pH and temperature. Some examples of metal compounds applicable herein include the metal halides (e.g., $CuCl_2$, $CdCl_2$, $ZnCl_2$, $ZnBr_2$, $GaCl_3$, $InCl_3$, $FeCl_2$, $FeCl_3$, $SnCl_2$, and $SnCl_4$), metal nitrates (e.g., $Cd(NO_3)_2$, $Ga(NO_3)_3$, $In(NO_3)_3$, and $Fe(NO_3)_3$), metal perchlorates, metal chlorates, metal chlorites, metal hypochlorites, metal carbonates (e.g., $CdCO_3$), metal sulfates (e.g., $CdSO_4$, $FeSO_4$, and $ZnSO_4$), metal sulfites, metal oxides (e.g., $Fe_2O_3$, CdO, $Ga_2O_3$, $In_2O_3$, ZnO, SnO, $SnO_2$), metal hydroxides (e.g., $Fe(OH)_3$ and $Zn(OH)_2$), metal oxyhydroxides (e.g., FeOOH, or FeO(OH), and their alternate forms), metal-EDTA complexes, metal amines (e.g., metal alkylamine, piperidine, pyridine, or bipyridine salt complexes), metal carboxylates (e.g., cadmium acetate), and metal acetylacetonates (i.e., metal-acac) complexes. For producing metal oxide particles, in particular, the metal-containing component can be a colloidal hydrous metal oxide or mixed metal oxide.

The aqueous solution in which the metal salt is included may or may not also include one or more water-miscible solvents. Some examples of water-miscible solvents include the alcohols (e.g., methanol, ethanol, and isopropanol), diols (e.g., ethylene glycol), acetone, and acetonitrile.

The reducing agent is any compound that has the ability to lower the $E_h$, (electron activity) of the aqueous solution. The reducing agent is preferably a mild reductant that does not cause the immediate reduction of the metal or non-metal component. Such immediate reduction results in an uncontrolled process. Thus, the reducing agent considered herein is preferably mild enough to permit a gradual and controlled particle growth process, generally over at least 6, 12, 18, 24, 36, 48, 60, 72, 84, or 96 hours. Some examples of mild reducing agents include alkali sulfides (e.g., sodium sulfide), mercaptan compounds (e.g., thiophenol), carboxylate or carboxylic acid compounds (e.g., formic, acetic, propionic, butyric, oxalic, malonic, succinic, fumaric, glutaric, lactic, pyruvic, glyoxylic, glycolic, ascorbic, and citric acids, and their salts, e.g., the acetates, such as sodium acetate), NADH, NADPH, phosphite compounds (e.g., triethylphosphite), dithiothreitol, and the Ti-NTA complex.

The reducing agent generally functions to maintain the $E_h$ at a lower value over the time course of the reaction. By judicious selection of the $E_h$ lowering agent and other conditions (particularly pH), the $E_h$ of the aqueous solution can be suitably selected to be precisely, about, at least, above, up to, or less than, for example, 400 mV, 300 mV, 250 mV, 200 mV, 150 mV, 100 mV, 50 mV, 0 mV, −50 mV, −150 mV, −200 mV, −250 mV, −300 mV, or −400 mV, or an $E_h$ value within a range bounded by any two of the foregoing values.

In some embodiments, particularly when metal non-oxide (e.g., metal chalcogenide or metal pnictide) particles are desired, a reducible non-metal component is included. The reducible non-metal component can be any compound known in the art to have a reductive capability. In the case of producing non-elemental particles (e.g., metal-sulfide, metal-selenide, metal-telluride, and metal-arsenide particles), the reducible non-metal component generally provides the chalcogen or pnictogen element that becomes incorporated into the particles. The chalcogen or pnictogen element may be, for example, S, Se, Te, N, P, As, Sb, or Bi. Some examples of reducible non-metal components that may have the ability to incorporate a non-oxide element into the particle composition include chalcogen-containing compounds (e.g., sulfide, selenide, telluride, sulfite, selenite, and tellurite salts of, e.g., alkali metals, such as lithium, sodium, or potassium, as well as organothiols, organoselenols, and organotellurols) and pnictogen-containing compounds (e.g., phosphite, hypophosphite, arsenite, antimonite, and bismuthite salts or uncharged compounds, e.g., hypophosphorus acid or a phosphite ester, such as trimethylphosphite, as well as organophosphines and organoarsines).

In a first embodiment, the reducible non-metal component is a sulfur-containing component. The sulfur-containing component can be, for example, elemental sulfur($S^0$) or a sulfur-containing compound. In one instance, the sulfur-containing compound is an inorganic sulfur-containing compound. Some examples of inorganic sulfur-containing compounds include the inorganic sulfates (e.g., $Na_2SO_4$, $K_2SO_4$, $MgSO_4$, $(NH_4)_2SO_4$, $H_2SO_4$, or a metal sulfate), the inorganic sulfites (e.g., $Na_2SO_3$, $H_2SO_3$, or $(NH_4)_2SO_3$), inorganic thiosulfates (e.g., $Na_2S_2O_3$ or $(NH_4)_2S_2O_3$), sulfur dioxide, peroxomonosulfate (e.g., $Na_2SO_5$ or $KHSO_5$), and peroxodisulfate (e.g., $Na_2S_2O_8$, $K_2S_2O_8$, or $(NH_4)_2S_2O_8$). In another instance, the sulfur-containing compound is an organosulfur compound that typically includes at least one sulfur-carbon bond. Some examples of suitable organosulfur compounds include the mercapto-amino acids (e.g., cysteine, homocysteine, methionine, thioserine, thiothreonine, and thiotyrosine), mercapto-peptides (e.g., glutathione), the mercapto-pyrimidines (e.g., 2-thiouracil, 6-methyl-2-thiouracil, 4-thiouracil, 2,4-dithiouracil, 2-thiocytosine, 5-methyl-2-thiocytosine, 5-fluoro-2-thiocytosine, 2-thiothymine, 4-thiothymine, 2,4-dithiothymine, and their nucleoside and nucleotide analogs), the mercapto-purines (e.g., 6-thioguanine, 8-thioadenine, 2-thioxanthine, 6-thioxanthine, 6-thiohypoxanthine, 6-thiopurine, and their nucleoside and nucleotide analogs), the thioethers (e.g., dimethylsulfide, diethylsulfide, diphenylsulfide, biotin), the disulfides (e.g., cystine, lipoic acid, diphenyl disulfide, iron disulfide, and 2-hydroxyethyldisulfide), the thiocarboxylic acids (e.g., thioacetic acid), the thioesters, the sulfonium salts (e.g., trimethylsulfonium or diphenylmethylsulfonium chloride), the sulfoxides (e.g., dimethylsulfoxide), the sulfones (e.g., dimethylsulfone), thioketones, thioamides, thiocyanates, isothiocyanates, thiocarbamates, dithiocarbamates, and trialkylphosphine sulfide (e.g., trioctylphosphine sulfide), thiourea compounds, or any of the inorganic sulfur-containing compounds, such as those enumerated above, which have been modified by inclusion of a hydrocarbon group. In particular embodiments, the organosulfur compound includes a sulfur-containing nucleic base (i.e., S-nucleobase), such as any of the mercapto-pyrimidines and mercapto-purines described above.

In a second embodiment, the reducible non-metal component is a selenium-containing component. The selenium-containing component can be, for example, elemental selenium($Se^0$) or a selenium-containing compound. In one instance, the selenium-containing compound is an inorganic selenium-containing compound. Some examples of inorganic selenium-containing compounds include the inorganic selenates (e.g., $Na_2SeO_4$, $K_2SeO_4$, $MgSeO_4$, $(NH_4)_2SeO_4$, $H_2SeO_4$, or a metal selenate), the inorganic selenites (e.g., $Na_2SeO_3$, $H_2SeO_3$, or $(NH_4)_2SeO_3$), inorganic selenosulfates (e.g., $Na_2SSeO_3$ or $(NH_4)_2SSeO_3$), selenium dioxide, and selenium disulfide. In another instance, the selenium-containing compound is an organoselenium compound that typically includes at least one selenium-carbon bond. Some examples of suitable organoselenium compounds include the seleno-amino acids (e.g., selenocysteine, selenocystine, selenohomocysteine, selenomethionine), the selenopyrimidines (e.g., 2-selenouracil, 6-methyl-2-selenouracil, 4-selenouracil, 2,4-diselenouracil, 2-selenocytosine, 5-methyl-2-selenocytosine, 5-fluoro-2-selenocytosine, 2-selenothymine, 4-selenothymine, 2,4-diselenothymine, and their nucleoside and nucleotide analogs), the selenopurines (e.g., 6-selenoguanine, 8-selenoadenine, 2-selenoxanthine, 6-selenoxanthine, 6-selenohypoxanthine, 6-selenopurine, and their nucleoside and nucleotide analogs), the selenides (e.g., dimethylselenide, diethylselenide, and methylphenylselenide), the diselenides (e.g., dimethyldiselenide, diethyldiselenide, and diphenyldiselenide), the selenocarboxylic acids (e.g., selenoacetic acid, selenopropionic acid), the selenosulfides (e.g., dimethylselenosulfide), the selenoxides (e.g., dimethylselenoxide and diphenylselenoxide), the selenones, the selenonium salts (e.g., dimethylethylselenonium chloride), the vinylic selenides, selenopyrylium salts, trialkylphosphine selenide (e.g., trioctylphosphine selenide, i.e., TOPSe), selenourea compounds, or any of the inorganic selenium-containing compounds, such as those enumerated above, which have been modified by inclusion of a hydrocarbon group. In particular embodiments, the organoselenium compound includes a selenium-containing nucleic base (i.e., Se-nucleobase), such as any of the selenopyrimidines and selenopurines described above.

In a third embodiment, the reducible non-metal component is a tellurium-containing component. The tellurium-containing component can be, for example, elemental tellurium) ($Te^0$) or a tellurium-containing compound. In one instance, the tellurium-containing compound is an inorganic tellurium-containing compound. Some examples of inorganic tellurium-containing compounds include the inorganic tellurates (e.g., $Na_2TeO_4$, $K_2TeO_4$, $MgTeO_4$, $(NH_4)_2TeO_4$, $H_2TeO_4$, $H_6TeO_6$, or a metal tellurate), the inorganic tellurites (e.g., $Na_2TeO_3$), and tellurium dioxide. In another instance, the tellurium-containing compound is an organotellurium compound that typically includes at least one tellurium-carbon bond. Some examples of suitable organotellurium compounds include the telluro-amino acids (e.g., tellurocysteine, tellurocystine, tellurohomocysteine, telluromethionine), the telluropyrimidines and their nucleoside and nucleotide analogs (e.g., 2-tellurouracil), the telluropurines and their nucleoside and nucleotide analogs, the tellurides (e.g., dimethyltelluride, diethyltelluride, and methylphenyltelluride), the ditellurides (e.g., dimethylditelluride, diethylditelluride, and diphenylditelluride), the telluroxides (e.g., dimethyltelluroxide and diphenyltelluroxide), the tellurones, the telluronium salts, the vinylic tellurides, telluropyrylium salts, tellurourea compounds, 24-telluracholestanol, or any of the inorganic tellurium-containing compounds, such as those enumerated above, which have been modified by inclusion of a hydrocarbon group. In particular embodiments, the organotellurium compound includes a tellurium-containing nucleic base (i.e., Te-nucleobase), such as any of the telluropyrimidines and telluropurines described above.

In a fourth embodiment, the reducible non-metal component is an arsenic-containing component. In one instance, the arsenic-containing component is an inorganic arsenic-containing compound. Some examples of inorganic arsenic-containing compounds include the inorganic arsenates (e.g., $Na_3AsO_4$, $Na_2HAsO_4$, $NaH_2AsO_4$, $H_3AsO_4$, $Mg_3(AsO_4)_2$, 1-arseno-3-phosphoglycerate, or a transition metal arsenate), inorganic arsenites (e.g., $Na_3AsO_3$, $Na_2HAsO3$, $NaH_2AsO_3$, $H_3AsO_3$, $Ag_3AsO_3$, $Mg_3(AsO_3)_2$), and arsenic oxides (e.g., $As_2O_3$ and $As_2O_5$), and arsenous carbonate (i.e., $As_2(CO_3)_3$). In another instance, the arsenic-containing compound is an organoarsine compound. Some examples of suitable organoarsine compounds include the hydrocarbon arsines (e.g., trimethylarsine, triethylarsine, triphenylarsine, arsole, and 1,2-bis(dimethylarsino)benzene), arsenic-derivatized sugars (e.g., glucose 6-arsenate), arsonic acids (e.g., phenylarsonic acid, 4-aminophenylarsonic acid, 4-hydroxy-3-nitrobenzenearsonic acid, 2,3,4-trihydroxybutylarsonic acid, arsonoacetic acid, diphetarsone, diphenylarsinic acid, and 3-arsonopyruvate), arseno-amino acids and their derivatives (e.g., 3-arsonoalanine, arsenophenylglycine, and arsenate tyrosine), organoarsine oxides (e.g., methylarsine oxide, 4-aminophenylarsenoxide, oxophenylarsine, and oxophenarsine), 10,10'-oxybis-10H-phenoxarsine, 1-arseno-3-phosphoglycerate, arsenobetaine, arsenocholine, arsenotriglutathione, or any of the inorganic arsenic-containing compounds, such as those enumerated above, which have been modified by inclusion of a hydrocarbon group.

Generally, the reducible non-metal component is not a reduced sulfide (e.g., $Na_2S$, $K_2S$, $H_2S$, or $(NH_4)_2S$), reduced selenide (e.g., $H_2Se$ or $(NH_4)_2Se$), reduced telluride (e.g., $H_2Te$ or $(NH_4)_2Te$), or reduced arsenide compound. As known in the art, such reduced compounds have a propensity for directly reducing and quickly precipitating various metals from solution by uncontrolled production of particulates. In certain embodiments, any of the above reduced compositions may function as a reducible non-metal component if they are in a form that lowers their reactivity to the extent that they do not directly reduce and suddenly precipitate the metal, as in certain adduct forms, such as with cysteine or an analog thereof.

The aqueous solution also includes a pH adjusting agent, which may be an acid, base, or buffer to suitably adjust or maintain the pH during the particle growth process. The acid can be a weak acid, such as an organic acid, such as acetic acid, propionic acid, or phosphoric acid. Alternatively, the acid can be a strong acid, such as a mineral acid, such as hydrochloric acid, hydrobromic acid, hydroiodic acid, sulfuric acid, or a superacid, such as triflic acid. Some examples of bases include the metal hydroxides (e.g., hydroxides of lithium, sodium, potassium, magnesium, and calcium), metal alkoxides (e.g., lithium methoxide), metal carbonates (e.g., sodium carbonate), ammonia, and organoamines (e.g., methylamine, dimethylamine, ethylamine, triethylamine, diisopropylamine, aniline, and pyridine). The pH of the aqueous solution, as adjusted by the pH adjusting agent, can be about, precisely, at least, above, up to, or less than, for example, 1, 2, 3, 4, 5, 6, 7, 8, 9, 10, 11, or 12, or within a range bounded by any two of the foregoing pH values. Depending on the type of acid or base and other conditions, the molar concentration of acid or base (per total volume of precursor composition) in the aqueous solution can be at least, above, up to, or less than, for example, 0.5 molar (i.e., 0.5 M), 0.6 M, 0.7 M, 0.8 M, 1.0 M, 1.2 M, 1.5 M, 1.8 M, 2.0 M, 2.5 M, 3.0 M, 3.5 M, 4.0 M, 4.5 M, 5.0 M, or an acid or base concentration within a range bounded by any two of the foregoing values. The molar concentration values given may also be referred to in terms of molar equivalents of $H^+$, or pH, wherein the pH for a strong acid generally abides by the formula $pH=-\log [H^+]$, wherein $[H^+]$ represents the concentration of $H^+$ ions. In particular embodiments, the pH of the aqueous solution is maintained at a specific pH or a narrow range of pH (e.g., ±20%, 10%, or 5%) during the course of the reaction (e.g., by regular dosing of an acid or base, as needed, during the course of the reaction) in order to further adjust the $E_h$ value of the solution and to produce metal-containing particles of a specific composition, morphology, size, or crystalline character, e.g., crystalline vs. amorphous forms.

The buffer, if present, may or may not also function as a surfactant. The buffer can be any of the buffers known in the art, such as a citrate, acetate, phosphate, or borate buffer or buffering system. Some specific buffers include monopotassium phosphate, dipotassium phosphate, 4-2-hydroxyethyl-1-piperazineethanesulfonic acid (HEPES), tris(hydroxymethyl)methylamine (Tris), 3-(N-morpholino)propanesulfonic acid (MOPS), piperazine-N,N'-bis(2-ethanesulfonic acid) (PIPES), 2-(N-morpholino)ethanesulfonic acid (MES), and 2-{[tris(hydroxymethyl)methyl]-amino}ethanesulfonic acid (TES).

The aqueous solution may or may not also include one or more surfactants. The one or more surfactants (the surfactant component) used in the method are any compounds or materials that have an ability to associate with the surface of a metal-containing particle (i.e. are surface active), most notably the amphiphilic class of surfactants, which include charged amphiphilic surfactants (e.g., ammonium, carboxylated, sulfonated, and zwitterionic long chain hydrocarbons) and neutral amphiphilic surfactants (e.g., hydroxylated, amidated, and/or polyethyleneoxylated (PEGylated) hydrocarbons, and siloxanes). The surfactants are preferably water-soluble, either by being naturally water-soluble, or alternatively, by being rendered substantially water-soluble by the inclusion of one or more solubilizers (e.g., an alcohol) in the aqueous solution. The surfactants may also be partially soluble or substantially insoluble in water. If so, measures are taken to ensure that the surfactants contact the particles (e.g., by means of agitation or a transfer agent).

Many of the surfactants contain a hydrocarbon moiety and a functionalized (i.e., non-hydrocarbon) moiety. Unless otherwise specified, the hydrocarbon moiety can represent a saturated or unsaturated, and straight-chained, branched, or cyclic hydrocarbon group containing at least one carbon atom. In different embodiments, the hydrocarbon moiety can preferably possess, for example, one, two, three, four, five, six, seven, or eight carbon atoms, or a minimum number of carbon atoms corresponding to any one of the foregoing examples of carbon atoms, or a range of carbon atoms resulting from any two of the foregoing examples of carbon atoms.

The surfactants typically associate with the particle surface by forming an interface between the particle surface and the aqueous solution. In order to function as a surfactant, the surfactant is used in a concentration high enough for surfactant molecules to associate with surfaces of the particles to an extent that precipitation of the particles is facilitated. Such a surfactant concentration is herein also referred to as an "effective concentration" of surfactant. Preferably, an effective concentration of surfactant is one that also permits size control or shape control of the particles during growth of the particles. Generally, the surfactant concentration is at least 100 mg/L (i.e., 0.01 wt % or 100 ppm). In different embodiments, the surfactant concentration can preferably be at, greater than, or less than 100, 200, 300, 400, 500, 600, 700, 800, 900, or 1,000 mg/L, or a range of concentrations resulting from any two of the foregoing exemplary values.

In a first embodiment, the surfactant component includes one or more organosiloxane (i.e., organosilicone) molecules and/or polymers. The organosiloxane molecule or polymer contains a hydrocarbon moiety and at least one Si—OH or Si—OR moiety, wherein the R group and hydrocarbon moiety independently represent any of the types of hydrocarbon moieties described above.

The organosiloxane can be, for example, a monosiloxane (i.e., contains one Si atom). The monosiloxane can, in turn, be a monoalkoxysilane, dialkoxysilane, or trialkoxysilane. Some examples of monoalkoxysilanes include trimethylmethoxysilane, trimethylethoxysilane, triethylmethoxysilane, tri-(n-propyl)methoxysilane, tri-(n-butyl)methoxysilane, tri-(isobutyl)methoxysilane, tri-(n-pentyl)methoxysilane, tri-(n-hexyl)methoxysilane, dimethylethylmethoxysilane, n-propyldimethylmethoxysilane, and vinyldimethylmethoxysilane. Some examples of dialkoxysilanes include dimethyldimethoxysilane, dimethyldiethoxysilane, diethyldimethoxysilane, di-(n-propyl)dimethoxysilane, di-(n-butyl)dimethoxysilane, di-(isobutyl)dimethoxysilane, di-(n-pentyl)dimethoxysilane, di-(n-hexyl)dimethoxysilane, methylethyldimethoxysilane, and n-propylmethyldimethoxysilane). Some examples of trialkoxysilanes include methyltrimethoxysilane, methyltriethoxysilane, ethyltrimethoxysilane, n-propyltrimethoxysilane, n-butyltrimethoxysilane, isobutyltrimethoxysilane, n-pentyltrimethoxysilane, isopentyltrimethoxysilane, n-hexyltrimethoxysilane, n-heptyltrimethoxysilane, n-octyltrimethoxysilane, n-nonyltrimethoxysilane, n-decyltrimethoxysilane, 2-hydroxyethyltrimethoxysilane, and 3-hydroxypropyltrimethoxysilane. The corresponding monohydroxysilanes, dihydroxysilanes, or trihydroxysilanes (i.e., wherein the alkoxy group is substituted by a hydroxy group) are also considered herein as suitable examples.

The organosiloxane can also be, for example, a disiloxane (i.e., contains two Si atoms). Some examples of suitable disiloxane molecules include hexamethyldisiloxane, hexaethyldisiloxane, and hexaphenyldisiloxane. The disiloxane may also be incompletely substituted with hydrocarbon groups such that silylhydride (Si—H) groups are present. Some examples of such disiloxane molecules include pentamethyldisiloxane, 1,1,3,3-tetramethyldisiloxane, and 1,1,3,3-tetraethyldisiloxane. Disiloxane groups in which the hydrocarbon groups are replaced by alkoxy or hydroxy groups are also considered herein.

The organosiloxane can also be, for example, a trisiloxane (i.e., contains three Si atoms). Some examples of suitable trisiloxane molecules include octamethyltrisiloxane, octaethyltrisiloxane, and 1,1,1,5,5,5-hexamethyl-3,3-diphenyltrisiloxane. The trisiloxane may also be incompletely substituted with hydrocarbon groups such that silylhydride groups are present. Some examples of such trisiloxane molecules include heptamethyltrisiloxane (commercially available, e.g., Drift® Snowmaking Additive, Aquatrols, 1273 Imperial Way, Paulsboro, N.J. 08066), 1,1,1,5,5,5-hexamethyltrisiloxane, and 1,1,3,3,5,5-hexamethyltrisiloxane. Trisiloxane groups in which the hydrocarbon groups are replaced by alkoxy or hydroxy groups are also considered herein.

Other suitable organosiloxane molecules include, for example, the tetrasiloxanes, pentasiloxanes, hexasiloxanes, polysiloxanes, cyclotrisiloxanes, cyclotetrasiloxanes, cyclopentasiloxanes, cyclohexasiloxanes, silsesquioxanes, and their silylhydride-, alkoxy-, and hydroxy-containing forms. The organosiloxanes may also be substituted with any suitable functional groups, e.g., one or more epoxy, glycidyl, ethyleneoxide, di(ethyleneoxide), poly(ethyleneoxide), amide, keto, ether, fluoro, chloro, or carboxylic acid groups.

In a second embodiment, the surfactant component includes one or more ammonium salt molecules and/or polymers. The ammonium molecule or polymer contains a hydrocarbon moiety as described above and at least one positively charged amino group (e.g., at least one $NR_4^+$ group in the case of a quaternary ammonium group, wherein the four R groups are each independently a hydrocarbon moiety as described above). Preferably, the hydrocarbon moiety is composed only of carbon and hydrogen, and optionally, fluorine atoms. Fluorine atoms, if present, may substitute a portion of or all of the hydrogen atoms of the hydrocarbon moiety. The counteranion of the ammonium salt is not particularly limited, and can be, for example, a halide, nitrate, sulfate, triflate, oxalate, carbonate, bicarbonate, or acetate. Some examples of suitable ammonium groups include trimethylammonium, tetramethylammonium, tetraethylammonium, tetrapropylammonium, tetrabutylammonium, dimethyldibutylammonium, tetraphenylammonium, trimethylbenzylammonium, n-butyltrimethylammonium, n-pentyltrimethylammonium, n-hexyltrimethylammonium, n-heptyltrimethylammonium, n-octyltrimethylammonium, n-nonyltrimethylammonium, and n-decyltrimethylammonium. Other ammonium groups include ring ammonium groups (e.g., pyridinium, piperidinium, pyrazinium, piperazinium, and imidazolium), wherein the ring can be substituted by one or more hydrocarbon groups. A particular ammonium-containing surfactant suitable for use herein is a mixture of one or more quaternary ammonium compounds with one or more tertiary amines. An example of such a mixture can be found under the trade name Armoclear® 2550, supplied by Akzo Nobel Surface Chemistry, Stenungsund, Sweden.

In a third embodiment, the surfactant component includes one or more carboxylic acid molecules and/or polymers. The carboxylic acid molecule or polymer contains a hydrocarbon moiety (as described above) and at least one carboxylic acid group. Preferably, the hydrocarbon moiety is composed only of carbon and hydrogen, and optionally, fluorine atoms. Fluorine atoms, if present, may substitute a portion or all of the hydrogen atoms of the hydrocarbon moiety. As used herein, "carboxylic acid" also includes the corresponding carboxylic acid salt (i.e., "carboxylate"), and vice-versa. The carboxylate can include any suitable counteranion, as described above. The carboxylic acid molecule can be, for example, a monocarboxylic acid, dicarboxylic acid, or tricarboxylic acid. Some examples of suitable carboxylic acid molecules include acetate, propionate, butyrate, valerate (pentanoate), hexanoate, heptanoate, octanoate, decanoate, undecanoate, laurate, myristate, palmitate, benzoate, oxalate, malonate, fumarate, maleate, succinate, glutarate, phthalate, citrate, and trifluoroacetate. In one embodiment, as exemplified above, the hydrocarbon moiety of the carboxylic acid molecule is unsubstituted, i.e., contains only carbon and hydrogen. In another embodiment, the hydrocarbon moiety is substituted with one or more ether, amido, keto, amino (primary, secondary, or tertiary), fluoro, or chloro groups. Some examples of amino-substituted carboxylic acid molecules include glycine, alanine, 3-aminopropanoic acid, 4-aminobutyric acid, 6-aminohexanoic acid, 11-aminoundecanoic acid, and p-aminobenzoic acid.

In a fourth embodiment, the surfactant component includes one or more alcohol molecules and/or polymers. The alcohol molecule or polymer contains a hydrocarbon moiety (as described above) and at least one alcohol (OH) group. Preferably, the hydrocarbon moiety is composed only of carbon and hydrogen, and optionally, fluorine atoms. Fluorine atoms, if present, may substitute a portion or all of the hydrogen atoms of the hydrocarbon moiety. The alcohol can be, for example, a mono-alcohol, diol, triol, or polyol. Some examples of suitable alcohols include methanol, ethanol, n-propanol, isopropanol, n-butanol, isobutanol, t-butanol, sec-butanol, n-pentanol (amyl alcohol), isopentanol (isoamyl alcohol), neopentanol, n-hexanol, phenol, benzyl alcohol, ethylene glycol, propylene glycol, 1,3-propanediol, 1,4-butanediol, 2,3-butanediol, 1,5-pentanediol, trifluoromethanol, 4-fluorophenol, pentafluorophenol, and polyvinylalcohol (PVA). Preferably, the alcohol contains at least four, five, or six carbon atoms. The alcohol is preferably straight-chained.

In a fifth embodiment, the surfactant component includes one or more metal diketones. The metal portion of the metal diketone can be any charged metal ion capable of forming a complex with a diketone molecule. Preferably, the metal is a transition metal, and more preferably, a first-row transition metal. Even more preferably, the metal is Fe(III), which corresponds to the class of iron (III) diketones. The diketone portion can be any diketone molecule capable of forming a complex with a metal ion. Preferably, the diketone is in the form of a diketonate, which refers to a negatively charged diketone molecule wherein a proton has been removed (i.e., conjugate base of the diketone). Some examples of diketone molecules include 2,3-butanedione, 2,4-pentanedione (acetylacetone), and 2,5-hexanedione. Of particular focus herein are the metal acetylacetonates (i.e., "metal acac" or "metal ACAC" complexes). Some examples of metal acac complexes include $V(III)(acac)_3$, $V(IV)(O)(acac)_2$, $Cr(III)(acac)_3$, $Mn(III)(acac)_3$, $Fe(III)(acac)_3$, $Co(II)(acac)_2$, $Ni(II)(acac)_2$, $Cu(II)(acac)_2$, $Zn(II)(acac)_2$, $Ru(III)(acac)_3$, $Pd(II)(acac)_2$, $Cd(II)(acac)_2$, and $Al(III)(acac)_3$. In a preferred embodiment, the metal diketonate is $Fe(III)(acac)_3$.

In a sixth embodiment, the surfactant component includes one or more fluorohydrocarbon compounds or polymers. The fluorohydrocarbon compounds can be saturated or unsaturated, and straight-chained, branched, or cyclic. Preferably, the fluorohydrocarbon compounds contain at least four, five, six, seven, or eight carbon atoms.

In one embodiment, the fluorohydrocarbon compounds are completely substituted with fluoro groups such that the compounds are composed of only carbon and fluorine atoms (i.e., the "perfluoro" compounds). In another embodiment, the fluorohydrocarbon compounds are incompletely substituted with fluoro groups such that the compounds are composed of carbon, hydrogen, and fluorine atoms. Some examples of suitable fluorohydrocarbon compounds include perfluoropentane, perfluorohexane, perfluoroheptane, perfluorooctane, perfluorodecalin, perfluoromethylcyclobutane (empirical formula $C_5F_{10}$), perfluorodimethylcyclobutane (empirical formula $C_6F_{12}$), perfluoromethylcyclopentane, (trifluoromethyl)cyclopentane, bis-1,3-(trifluoromethyl)cyclopentane, perfluorodimethylcyclopentane (1,2- or 1,3-dimethyl isomers, or a mixture thereof), perfluoromethylcyclohexane, perfluorodimethylcyclohexane (1,2-, 1,3-, or 1,4-dimethyl isomers, or a mixture thereof), bis-1,4-(trifluoromethyl)cyclohexane, perfluoroethylcyclohexane, perfluoroisopropylcyclohexane, perfluorotrimethylcyclohexane, perfluorocycloheptane, perfluorocyclooctane, octafluoronaphthalene, perfluorotoluene, and perfluoroxylenes.

In a seventh embodiment, the surfactant component includes one or more bacterial proteins. Some particular bacterial proteins considered herein are ice-nucleating proteins derived from *Pseudomonas syringae*. These proteins are commercially available, e.g., under the trade name Snomax®.

In some embodiments, any one or more of the classes or specific types of reducing agent, reducible non-metal component, surfactants or buffers, described above are excluded from the aqueous solution. Moreover, in some embodiments, the surfactant or buffer may function as a surface-active agent, metal bonding agent, or chelator, whereas in other embodiments, the surfactant or buffer does not function as a surface-active agent, metal bonding agent, or chelator.

In some embodiments, a ligand or chelating agent is included in the aqueous solution. In some cases, the ligand or chelating agent is selected from any of the surfactants or buffers described above that have an ability to chelate charged metal atoms, particularly the diketonates and carboxylates described above. Some examples of other ligands or chelating agents include the diamines (e.g., EDTA), triamines, tetramines, imines, diimines, salicylimines (e.g., salen), aniline, saturated and unsaturated (or aromatic) heterocyclic rings (e.g., pyridine, bipyridine, piperidine, piperazine, and thiazole), phenolates, and thiophenolates.

The produced particles can have any of a variety of compositions. In the case of non-oxide metal-containing particles, these contain at least one chalcophile metal and at least one non-oxide main group element, typically at least one chalcogen element in a negative oxidation state, i.e., sulfur (S), selenium (Se), and tellurium (Te), and/or at least one pnictogen element in a negative oxidation state, i.e., nitrogen (N), phosphorus (P), arsenic (As), and bismuth (Bi). The chalcophile metal is one, as known in the art, which has a propensity for forming metal-chalcogenide (i.e., metal-sulfide, metal-selenide, and metal-telluride) compositions. Some examples of chalcophile metals include, for example, Sc, Ti, V, Cr, Mn, Fe, Co, Ni, Cu, Zn, Y, Zr, Nb, Hf, Ta, Cd, Mo, W, Ag, Pd, Pt, Ga, In, Ti, Ge, Sn, Pb, Sb, and Bi. Some metals particularly considered herein include Cd, Cu, Fe, Ga, In, Sn, and Zn.

In some embodiments, the non-oxide particles have a mono-metal or mixed-metal chalcogenide or pnictide composition of the general formula:

$$[(M'_x M''_{w-v})^{+r}]_s X^{-m}_z \qquad (1)$$

In Formula (1) above, each of M' and M" represents at least one metal cation, at least one of which is a transition metal cation, wherein M' and M" are the same or different, X represents S, Se, Te, N, P, As, Sb, or Bi, or a combination thereof, and the subscripts or superscripts w, v, x, s, r, m, and z are integer or fractional numbers that together maintain charge balancing, wherein r×s=m×z, wherein "x" in the latter equation represents multiplication, unlike "x" in Formula (1) where it represents a variable. Moreover, in some embodiments, a cationic or anionic deficiency may result in a non-stoichiometric ratio between elements. M' and M" can independently be any of the metal cations described above. Some examples of such compositions, which can be considered quantum dot compositions, include the sub-generic compositions MX' (wherein M is a chalcophile metal, such as Zn, Cd, Cu, or Sn, and X' is S, Se, Te, or combination therefore), such as, more particularly, CdS, CdSe, CdTe, $CdS_xSe_{1-x}$, $Cd_3As_2$, ZnS, ZnSe, ZnTe, $ZnS_xSe_{1-x}$, $Zn_3As_2$, $Ga_2S_3$, $Ga_2Se_3$, $Ga_2Te_3$, GaAs, $In_2S_3$, $In_2Se_3$, $In_2Te_3$, InAs, CuS, CuSe, CuTe, $Cu_3As_2$, FeSe, $Fe_3As_2$, FeAs, PbS, PbSe, PbTe, $Pb_3As_2$, HgS, HgSe, HgTe, $Cd_xZn_{1-x}Te$, $Cd_xHg_{1-x}Te$, $Hg_xZn_{1-x}Te$, $Cd_xZn_{1-x}S$, $Cd_xZn_{1-x}Se$, $Cd_xZn_{1-x}S_ySe_{1-y}$, $Cd_xHg_{1-x}Se$, $Hg_xZn_{1-x}Se$, $Pb_xSn_{1-x}Te$, $Ga_xIn_{2-x}Se_3$, and $Ga_xIn_{1-x}As$, wherein x and y are, independently, an integral or non-integral numerical value greater than 0 and less than or equal to 1 (or less than or equal to 2 for the expression 2−x).

In other embodiments, the non-oxide particles have a composition encompassed by the following general formula:

$$Cu(In_xGa_{1-x})X'_2 \qquad (2)$$

In Formula (2) above, x is an integral or non-integral numerical value of or greater than 0 and less than or equal to 1, and X' represents at least one non-metal selected from S, Se, and Te. In different embodiments, X' represents S, Se, Te, or a combination of two or three of these elements. X' can also be represented by the formula $S_jSe_kTe_m$, wherein j, k, and m are independently 0 or an integral or non-integral numerical value greater than 0 and less than or equal to 1, provided that the sum of j, k, and m is 1. Compositions according to Formula (2) and subformulas encompassed therein are collectively referred to herein as CIGs compositions. The CIGs compositions encompassed by Formula (2) may also contain a relative molar ratio of Cu that diverges from 1.

In particular embodiments, the CIGs composition is according to the following sub-formula:

$$CuIn_xGa_{1-x}S_2 \qquad (2a)$$

Some specific examples of compositions according to Formula (2a) include $CuInS_2$, $CuIn_{0.9}Ga_{0.1}S_2$, $CuIn_{0.8}Ga_{0.2}S_2$, $CuIn_{0.7}Ga_{0.3}S_2$, $CuIn_{0.6}Ga_{0.4}S_2$, $CuIn_{0.5}Ga_{0.5}S_2$, $CuIn_{0.4}Ga_{0.6}S_2$, $CuIn_{0.3}Ga_{0.7}S_2$, $CuIn_{0.2}Ga_{0.8}S_2$, $CuIn_{0.1}Ga_{0.9}S_2$, and $CuGaS_2$.

In other particular embodiments, the CIGs composition is according to the following sub-formula:

$$CuIn_xGa_{1-x}Se_2 \qquad (2b)$$

Some specific examples of compositions according to Formula (2b) include $CuInSe_2$, $CuIn_{0.9}Ga_{0.1}Se_2$, $CuIn_{0.8}Ga_{0.2}Se_2$, $CuIn_{0.7}Ga_{0.3}Se_2$, $CuIn_{0.6}Ga_{0.4}Se_2$, $CuIn_{0.5}Ga_{0.5}Se_2$, $CuIn_{0.4}Ga_{0.6}Se_2$, $CuIn_{0.3}Ga_{0.7}Se_2$, $CuIn_{0.2}Ga_{0.8}Se_2$, $CuIn_{0.1}Ga_{0.9}Se_2$, and $CuGaSe_2$.

In yet other particular embodiments, the CIGs composition is according to the following sub-formula:

$$CuIn_xGa_{1-x}Te_2 \qquad (2c)$$

Some specific examples of compositions according to Formula (2c) include $CuInTe_2$, $CuIn_{0.9}Ga_{0.1}Te_2$, $CuIn_{0.8}Ga_{0.2}Te_2$, $CuIn_{0.7}Ga_{0.3}Te_2$, $CuIn_{0.6}Ga_{0.4}Te_2$, $CuIn_{0.5}Ga_{0.5}Te_2$, $CuIn_{0.4}Ga_{0.6}Te_2$, $CuIn_{0.3}Ga_{0.7}Te_2$, $CuIn_{0.2}Ga_{0.1}Ga_2$, $CuIn_{0.1}Ga_{0.9}Te_2$, and $CuGaTe_2$.

In some embodiments, the non-oxide particles have a composition encompassed by the following general formula:

$$M_xX''X'_y \qquad (3)$$

In Formula (3) above, M represents at least one chalcophile (for example, divalent or monovalent) metal species other than Sn, X" is selected from Ge, Sn, As, and Sb, or a combination thereof, X' is selected from S, Se, and Te, x is 2 or 3, and y is 2, 3, or 4 (more typically, 3 or 4). In particular embodiments, M represents one, two, three, or four metals selected from Cu, Fe, Zn, and Cd.

In particular embodiments of Formula (3), the non-oxide particles have a quaternary kesterite-type composition encompassed by the following general formula:

$$M_3SnX'_4 \qquad (4)$$

In Formula (4) above, M represents at least one chalcophile metal other than Sn, and X' is as defined above. The relative molar ratio of Sn encompassed by Formula (4) may diverge from 1.

In some embodiments, the kesterite-type compositions of Formula (4) are encompassed by the following sub-generic formula:

$$Cu_{3-x}M'_xSnX'_4 \qquad (4a)$$

In Formula (4a), M' represents one or more chalcophile metals other than Cu, and X' is as defined above (S, Se, and/or Te). In particular embodiments, M' represents one, two, or three metals selected from any chalcophile metal, such as, for example, V, Cr, Mn, Co, Ni, Fe, Zn, Cd, Cu, Mo, W, Pd, Pt, Au, Ag, Hg, Ga, In, Tl, Ge, Sn, Pb, Sb, and Bi. Some metals particularly considered herein include Fe, Zn, and Cd. The subscript x is an integral or non-integral numerical value of or greater than 0 and up to or less than 1, 2, or 3. In different embodiments, x can be selected to be a value of precisely or about 1, 2, or 3, or a non-integral value between 0 and 3, wherein the term "about" generally indicates within ±0.5, ±0.4, ±0.3, ±0.2, or ±0.1 of the value. For example, a value of about 1 generically indicates, in its broadest sense, that x can be 0.5 to 1.5 (i.e., 1±0.5).

Some particular kesterite-type compositions of Formula (4a) are encompassed by the following sub-generic formula:

$$Cu_{3-x}Zn_xSnX'_4 \qquad (4a-1)$$

In Formula (4a-1), x and X' are as described above under Formula (3) or (4a). Some specific examples of compositions according to Formula (4a-1) when X' is S include $Cu_3SnS_4$ (kuramite), $Cu_2ZnSnS_4$ (kesterite), $CuZn_2SnS_4$, $Cu_{0.5}Zn_{2.5}SnS_4$, $Cu_{2.5}Zn_{0.5}SnS_4$, $Cu_{1.5}Zn_{1.5}SnS_4$, and $Zn_3SnS_4$. Other examples of compositions according to Formula (4a-1) are provided by replacing S in the foregoing examples with Se, Te, or a combination of non-metals selected from S, Se, and Te. The relative molar ratio of Sn encompassed by formula (4a-1) may diverge from 1.

Other particular kesterite-type compositions of formula (4a) are encompassed by the following sub-generic formula:

$$Cu_{3-x}Fe_xSnX'_4 \qquad (4a-2)$$

In Formula (4a-2), x and X' are as described above under Formula (4a). Some specific examples of compositions according to Formula (4a-2) when X is S include $Cu_3SnS_4$, $Cu_2FeSnS_4$ (stannite), $CuFe_2SnS_4$, $Cu_{0.5}Fe_{2.5}SnS_4$, $Cu_{2.5}Fe_{0.5}SnS_4$, $Cu_{1.5}Fe_{1.5}SnS_4$, and $Fe_3SnS_4$. Other examples of compositions according to Formula (4a-2) are provided by replacing S in the foregoing examples with Se, Te, or a combination of non-metals selected from S, Se, and Te. The relative molar ratio of Sn encompassed by Formula (4a-2) may diverge from 1.

Other particular kesterite-type compositions of Formula (4a) are encompassed by the following sub-generic formula:

$$Cu_{3-x}Cd_xSnX'_4 \qquad (4a-3)$$

In Formula (4a-3), x and X' are as described above under Formula (4a). Some specific examples of compositions according to Formula (4a-3) when X is S include $Cu_3SnS_4$, $Cu_2CdSnS_4$ (cernyite), $CuCd_2SnS_4$, $Cu_{0.5}Cd_{2.5}SnS_4$, $Cu_{2.5}Cd_{0.5}SnS_4$, $Cu_{1.5}Cd_{1.5}SnS_4$, and $Cd_3SnS_4$. Other examples of compositions according to Formula (4a-3) are provided by replacing S in the foregoing examples with Se, Te, or a combination of non-metals selected from S, Se, and Te. The relative molar ratio of Sn encompassed by Formula (4a-3) may diverge from 1.

In other embodiments, the kesterite-type compositions of Formula (4) are encompassed by the following sub-generic formula:

$$Cu_2M'_xM'_{1-x}SnX'_4 \qquad (4b)$$

In Formula (4b), each M' is defined as above under Formula (4a), x is an integral or non-integral numerical value of or greater than 0 and up to or less than 1, and X' is as defined above. In particular embodiments, the two M' metals in Formula (4b) are not the same, i.e., the two M' metals in Formula (4b) are different. The relative molar ratio of Sn encompassed by Formula (4b) may diverge from 1, and the relative molar ratio of Cu encompassed by Formula (4b) may diverge from 2.

Some particular kesterite-type compositions of Formula (4b) are encompassed by the following sub-generic formula:

$$Cu_2Fe_xZn_{1-x}SnX'_4 \qquad (4b-1)$$

Some specific examples of compositions according to Formula (4b-1) when X is S include $Cu_2Fe_{0.1}Zn_{0.9}SnS_4$, $Cu_2Fe_{0.2}Zn_{0.8}SnS_4$, $Cu_2Fe_{0.3}Zn_{0.7}SnS_4$, $Cu_2Fe_{0.4}Zn_{0.6}SnS_4$, $Cu_2Fe_{0.5}Zn_{0.5}SnS_4$, $Cu_2Fe_{0.6}Zn_{0.4}SnS_4$, $Cu_2Fe_{0.7}Zn_{0.3}SnS_4$, $Cu_2Fe_{0.8}Zn_{0.2}SnS_4$, and $Cu_2Fe_{0.9}Zn_{0.1}SnS_4$. Other examples of compositions according to Formula (4b-1) are provided by replacing S in the foregoing examples with Se, Te, or a combination of non-metals selected from S, Se, and Te. The relative molar ratio of Sn encompassed by Formula (4b-1) may diverge from 1, and the relative molar ratio of Cu encompassed by Formula (4b-1) may diverge from 2.

In other embodiments, the kesterite-type compositions of Formula (4) are encompassed by the following sub-generic formula:

$$CuM'_xM'_{2-x}SnX'_4 \qquad (4c)$$

In Formula (4c), each M' is defined as above under Formula (4a), x is an integral or non-integral numerical value of at least or greater than 0 and up to or less than 1 or 2, and X' is as defined above. In particular embodiments, the two M' metals in Formula (4c) are not the same, i.e., the two M' metals in Formula (4c) are different. In different embodiments, x can be selected to be a value of precisely or about 1 or 2, or a non-integral value between 0 and 2, wherein the term "about" is as defined under Formula (4a). The relative molar ratio of Sn and Cu encompassed by Formula (4c) may each diverge from 1.

Some particular kesterite-type compositions of Formula (4c) are encompassed by the following sub-generic formula:

$$CuFe_xZn_{2-x}SnX'_4 \qquad (4c-1)$$

Some specific examples of compositions according to Formula (4c-1) when X' is S (i.e., $CuFe_xZn_{2-x}SnS_4$) include $CuFe_{0.5}Zn_{1.5}SnS_4$, $CuFeZnSnS_4$, and $CuFe_{1.5}Zn_{0.5}SnS_4$. Other examples of compositions according to Formula (4c-1) are provided by replacing S in the foregoing examples with Se, Te, or a combination of non-metals selected from S, Se, and Te. The relative molar ratio of Sn and Cu encompassed by Formula (4c-1) may each diverge from 1.

In other embodiments of Formula (3), the non-oxide particles have a tertiary kesterite-type composition encompassed by the following general formula:

$$M_2SnX'_3 \qquad (5)$$

In Formula (5) above, M represents at least one chalcophile (typically divalent) metal other than Sn, as further described above, and X' is as defined above. In particular embodiments, M represents one, two, three, or four metals selected from Cu, Fe, Zn, and Cd. The relative molar ratio of Sn encompassed by Formula (5) may diverge from 1.

Some examples of compositions according to Formula (5) include $Cu_2SnS_3$, $Cu_2SnSe_3$, $Cu_2SnTe_3$, $Fe_2SnS_3$, $Fe_2SnSe_3$, $Fe_2SnTe_3$, $Zn_2SnS_3$, $Zn_2SnSe_3$, $Zn_2SnTe_3$, $Cd_2SnS_3$, $Cd_2SnSe_3$, and $Cd_2SnTe_3$, as well as such composition wherein X' includes a combination of two or three chalcogens selected from S, Se, and Te, e.g., $Cu_2SnSSe_2$, and/or wherein M represents two or more metal species, e.g., $CuZnSnS_3$, $CuCdSnS_3$, $CuFeSnS_3$, $ZnCdSnS_3$, $CuZnSnSe_3$, and $CuZnSnTe_3$.

In other embodiments of Formula (3), the non-oxide particles have a thermoelectric composition encompassed by the following general formula:

$$M_3SbX'_4 \qquad (6)$$

In Formula (6) above, M represents at least one chalcophile (typically divalent) metal other than Sb, as further described above, and X' is as defined above. In particular embodiments, M represents one, two, three, or four metals selected from Cu, Fe, Zn, and Cd. The relative molar ratio of Sb encompassed by Formula (6) may diverge from 1. Some examples of compositions according to Formula (6) include $Cu_3SbS_4$, $Cu_3SbSe_4$, $Cu_3SbTe_4$, $Fe_3SbS_4$, $Fe_3SbSe_4$, $Fe_3SbTe_4$, $Zn_3SbS_4$, $Zn_3SbSe_4$, $Zn_3SbTe_4$, $Cd_3SbS_4$, $Cd_3SbSe_4$, and $Cd_3SbTe_4$, as well as such composition wherein X' includes a combination of two or three chalcogens selected from S, Se, and Te, e.g., $Cu_3SbSSe_3$, and/or wherein M represents two or more metal species, e.g., $Cu_2ZnSbS_3$, $Cu_2CdSbS_3$, $Cu_2FeSbS_3$, $ZnCdSbS_3$, $Cu_2ZnSbSe_3$, and $Cu_2ZnSbTe_3$.

In other embodiments of Formula (3), the non-oxide particles have a thermoelectric composition encompassed by the following general formula:

$$M_3GeX'_4 \qquad (7)$$

In Formula (7) above, M represents at least one chalcophile (typically divalent) metal other than Ge, as further described above, and X' is as defined above. In particular embodiments, M represents one, two, three, or four metals selected from Cu, Fe, Zn, and Cd. The relative molar ratio of Ge encompassed by Formula (7) may diverge from 1. Some examples of compositions according to Formula (7) include $Cu_3GeS_4$, $Cu_3GeSe_4$, $Cu_3GeTe_4$, $Fe_3GeS_4$, $Fe_3GeSe_4$, $Fe_3GeTe_4$, $Zn_3GeS_4$, $Zn_3GeSe_4$, $Zn_3GeTe_4$, $Cd_3GeS_4$, $Cd_3GeSe_4$, and $Cd_3GeTe_4$, as well as such composition wherein X' includes a combination of two or three chalcogens selected from S, Se, and Te, e.g., $Cu_3GeSSe_3$, and/or wherein M represents two or more metal species, e.g., $Cu_2ZnGeS_3$, $Cu_2CdGeS_3$, $Cu_2FeGeS_3$, $ZnCdGeS_3$, $Cu_2ZnGeSe_3$, and $Cu_2ZnGeTe_3$.

In other embodiments of Formula (3), the non-oxide particles have a thermoelectric composition encompassed by the following general formula:

$$M_3ArX'_4 \qquad (8)$$

In Formula (8) above, M represents at least one chalcophile (typically divalent) metal other than Ar, as further described above, and X' is as defined above. In particular embodiments, M represents one, two, three, or four metals selected from Cu, Fe, Zn, and Cd. The relative molar ratio of Ar encompassed by Formula (8) may diverge from 1. Some examples of compositions according to Formula (8) include $Cu_3ArS_4$, $Cu_3ArSe_4$, $Cu_3ArTe_4$, $Fe_3ArS_4$, $Fe_3ArSe_4$, $Fe_3ArTe_4$, $Zn_3ArS_4$, $Zn_3ArSe_4$, $Zn_3ArTe_4$, $Cd_3ArS_4$, $Cd_3ArSe_4$, and $Cd_3ArTe_4$, as well as such composition wherein X' includes a combination of two or three chalcogens selected from S, Se, and Te, e.g., $Cu_3ArSSe_3$, and/or wherein M represents two or more metal species, e.g., $Cu_2ZnArS_3$, $Cu_2CdArS_3$, $Cu_2FeArS_3$, $ZnCdArS_3$, $Cu_2ZnArSe_3$, and $Cu_2ZnArTe_3$.

In other respects, the produced metal-containing particles are metal oxide particles. As used herein, the term "metal oxide" indicates compounds or materials containing at least one metal species and oxide atoms, and the term "mixed-metal oxide" indicates compounds or materials containing at least two different metal species and oxide atoms. When more than one metal is included, the metals may be substantially intermixed throughout the mixed-metal oxide such that separate phases do not exist. Alternatively, the different metals may form distinct phases composed of different metal oxide compositions in the mixed-metal oxide. The metal oxide compounds or materials may or may not further contain, for example, one or more dopant or trace metal species, chemisorbed water, water of hydration, or adsorbed molecular groups. In some embodiments, the oxide composition may correspond to any of the non-oxide compositions provided above, except that at least a portion or all of the chalcogen or pnictogen species therein are replaced with oxide atoms.

In a first set of embodiments, the produced metal oxide particles have an oxide composition that contains one metal species, which is herein designated as a mono-metal oxide composition. In a second set of embodiments, the produced metal oxide particles have an oxide composition that contains at least two (or at least three, four, or more) metal species, which is herein designated as a mixed-metal oxide composition.

In some embodiments, the one or more metal species in the metal oxide composition is or includes a transition metal, i.e., Groups III-XII (scandium through zinc groups) of the Periodic Table. In some embodiments, the metal species is or includes a first-row transition metal. Some examples of first-row transition metal ions include Sc(III), Ti(IV), V(III), V(IV), V(V), Cr(III), Cr(VI), Mn(VII), Mn(V), Mn(IV), Mn(III), Fe(II), Fe(III), Co(III), Ni(III), Cu(I), and Cu(II). In other embodiments, the metal species is or includes a second-row transition metal. Some examples of second-row transition metal ions include Y(III), Zr(IV), Nb(IV), Nb(V), Mo(IV), Mo(VI), Ru(IV), Ru(VIII), Rh(III), Rh(IV), Pd(II), Ag(I), and Cd(II). In other embodiments, the metal species is or includes a third-row transition metal. Some examples of third-row transition metal species include Hf(IV), Ta(V), W(III), W(IV), W(VI), Re(IV), Re(VII), Ir(IV), Pt(IV), and Au(III). Some examples of metal oxide compositions containing a transition metal include the mono-metal oxide compositions $Sc_2O_3$, $TiO_2$, $Cr_2O_3$, $Fe_2O_3$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$, as well as mixed-metal oxide compositions wherein one or more metals replace a portion of any of the metals in the foregoing compositions, e.g., replacing a portion of Fe in $Fe_3O_4$ with Co to result in $CoFe_2O_4$, or wherein any of the foregoing metal oxide compositions are in admixture. Other examples of metal oxide compositions include the paratungstates and polyoxometallates, e.g., polyoxomolybdates, polyoxotungstates, and polyoxovanadates.

In other embodiments, the one or more metal species in the metal oxide composition is or includes an alkali, alkaline earth, main group, or lanthanide metal. Some examples of alkali metal species include $Li^+$, $Na^+$, $K^+$, and $Rb^+$, which may be incorporated in such mono-metal oxide compositions as $Li_2O$, $Na_2O$, $K_2O$, and $Rb_2O$. Some examples of alkaline earth metal species include $Be^{2+}$, $Mg^{2+}$, $Ca^{2+}$, and $Sr^{2+}$, which may be incorporated in such mono-metal oxide compositions as BeO, MgO, CaO, and SrO. Some examples of main group metal species (e.g., cations of Group IIIA-VIIA of the Periodic Table), include $B^{3+}$, $Al^{3+}$, $Ga^{3+}$, $In^{3+}$, $Tl^{1+}$, $Tl^{3+}$, $Si^{4+}$, $Ge^{4+}$, $Sn^{2+}$, $Sn^{4+}$, $Pb^{2+}$, $Pb^{4+}$, $N^{3+}$, $P^{3+}$, $P^{5+}$, $As^{3+}$, $As^{5+}$, $Sb^{3+}$, $Sb^{5+}$, and $Bi^{3+}$, which may be incorporated in such mono-metal oxide composition as $B_2O_3$, $Ga_2O_3$, $SnO$, $SnO_2$, $PbO$, $PbO_2$, $Sb_2O_3$, $Sb_2O_5$, and $Bi_2O_3$. Some examples of lanthanide metal species include any of the elements in the Periodic Table having an atomic number of 57 to 71, e.g., $La^{3+}$, $Ce^{3+}$, $Ce^{4+}$, $Pr^{3+}$, $Nd^{3+}$, $Sm^{3+}$, $Eu^{3+}$, $Gd^{3+}$, and $Tb^{3+}$, which may be incorporated in such mono-metal oxide composition as $La_2O_3$, $Ce_2O_3$, and $CeO_2$.

In a first set of embodiments, the produced metal oxide particles have an oxide composition that is a mono-metal oxide composition in which the metal species is selected from Sc, Ti, V, Cr, Mn, Fe, Co, Ni, Cu, Zn, Y, Zr, Nb, Hf, Ta, Cd, Mo, W, Ag, Pd, Pt, Ga, In, Tl, Ge, Sn, Pb, Sb, and Bi. In a second set of embodiments, the produced metal oxide particles have an oxide composition that is a mixed-metal oxide composition that includes at least one, two, three, or four metals selected from Sc, Ti, V, Cr, Mn, Fe, Co, Ni, Cu, Zn, Y, Zr, Nb, Hf, Ta, Cd, Mo, W, Ag, Pd, Pt, Ga, In, Tl, Ge, Sn, Pb, Sb, and Bi, or in which all of the metals are exclusively selected from the foregoing list of metal species.

In some embodiments, any one or more classes or specific types of metal species described above are excluded from the oxide composition. In other embodiments, two or more classes or specific types of metal species described above may be combined.

In some embodiments, the metal oxide particles have a mono-metal or mixed-metal oxide composition of the general formula:

$$[(M'_xM''_{w-x})^{+r}]_sO_y \quad (9)$$

In Formula (9) above, each of M' and M" represents at least one metal cation, at least one of which is a transition metal cation, wherein M' and M" are the same or different, and the subscripts w, x, s, r, and y are integer or fractional numbers that together maintain charge balancing, wherein rxs=2y. M' and M" can independently be any of the metal cations described above. Some examples of such compositions (e.g., $CoFe_2O_4$) have been provided above.

In some embodiments, the metal oxide particles have a perovskite structure of the formula:

$$M'M''O_3 \quad (10)$$

In Formula (10) above, M' and M" are typically different metal cations, thereby being further exemplary of mixed-metal oxide compositions. The metal cations can be independently selected from, for example, the first, second, and third row transition metals, lanthanide metals, and main group (particularly Groups IIIA and IVA) metals, such as Pb and Bi. More typically, M' represents a trivalent metal (often from Group IIIB) and M" represents a transition metal, and more typically, a first row transition metal. Some examples of perovskite oxides include $LaCrO_3$, $LaMnO_3$, $LaFeO_3$, $YCrO_3$, and $YMnO_3$.

It is also possible for M' and M" in Formula (10) to be the same metal, wherein Formula (10) reduces to $M'_2O_3$. In these compositions, M' is typically a first row transition metal. Some examples of such compositions include $Cr_2O_3$, and $Fe_2O_3$, both having the corundum crystal structure, and $Mn_2O_3$, having the bixbyite crystal structure.

In other embodiments, the metal oxide particles have a spinel structure of the formula:

$$M'_xM''_{3-x}O_4 \quad (11)$$

In Formula (11) above, M' and M" are the same or different metal cations. Typically, at least one of M' and M" is a transition metal cation, and more typically, a first-row transition metal cation. In order to maintain charge neutrality with the four oxide atoms, the oxidation states of M' and M" sum to +8. Generally, two-thirds of the metal ions are in the +3 state while one-third of the metal ions are in the +2 state. The +3 metal ions generally occupy an equal number of tetrahedral and octahedral sites, whereas the +2 metal ions generally occupy half of the octahedral sites. However, Formula (11) includes other chemically-acceptable possibilities, including that the +3 metal ions or +2 metal ions occupy only octahedral or tetrahedral sites, or occupy one type of site more than another type of site. The subscript x can be any numerical (integral or non-integral) positive value, typically at least 0.01 and up to 1.5.

When M' and M" in Formula (11) are the same, Formula (11) becomes simplified to the general formula:

$$M_3O_4 \quad (12)$$

Some examples of compositions according to Formula (12) include $Fe_3O_4$ (magnetite), $Co_3O_4$, and $Mn_3O_4$.

Some examples of spinel oxide compositions having two metals include those of the general composition $M'_yFe_{3-y}O_4$ (e.g., $Ti_yFe_{3-y}O_4$, $V_yFe_{3-y}O_4$, $Cr_yFe_{3-y}O_4$, $Mn_yFe_{3-y}O_4$, $Co_yFe_{3-y}O_4$, $Ni_yFe_{3-y}O_4$, $Cu_yFe_{3-y}O_4$, $Zn_yFe_{3-y}O_4$, $Pd_yFe_{3-y}O_4$, $Pt_yFe_{3-y}O_4$, $Cd_yFe_{3-y}O_4$, $Ru_yFe_{3-y}O_4$, $Zr_yFe_{3-y}O_4$, $Nb_yFe_{3-y}O_4$, $Gd_yFe_{3-y}O_4$, $Eu_yFe_{3-y}O_4$, $Tb_yFe_{3-y}O_4$, and $Ce_yFe_{3-y}O_4$); the general composition $M'_yCo_{3-y}O_4$ (e.g., $Ti_yCo_{3-y}O_4$, $V_yCo_{3-y}O_4$, $Cr_yCo_{3-y}O_4$, $Mn_yCo_{3-y}O_4$, $Ni_yCO_{3-y}O_4$, $Cu_yCO_{3-y}O_4$, $Zn_yCo_{3-y}O_4$, $Pd_yCo_{3-y}O_4$, $Pt_yCo_{3-y}O_4$, $Cd_yCo_{3-y}O_4$, $Ru_yCo_{3-y}O_4$, $Zr_yCo_{3-y}O_4$, $Nb_yCo_{3-y}O_4$, $Gd_yCo_{3-y}O_4$, $Eu_yCo_{3-y}O_4$, $Tb_yCo_{3-y}O_4$, and $Ce_yCo_{3-y}O_4$); and the general composition $M'_yNi_{3-y}O_4$ (e.g., $Ti_yNi_{3-y}O_4$, $V_yNi_{3-y}O_4$, $Cr_yNi_{3-y}O_4$, $Mn_yNi_{3-y}O_4$, $Fe_yNi_{3-y}O_4$, $Cu_yNi_{3-y}O_4$, $Zn_yNi_{3-y}O_4$, $Pd_yNi_{3-y}O_4$, $Pt_yNi_{3-y}O_4$, $Cd_yNi_{3-y}O_4$, $Ru_yNi_{3-y}O_4$, $Zr_yNi_{3-y}O_4$, $Nb_yNi_{3-y}O_4$, $Gd_yNi_{3-y}O_4$, $Eu_yNi_{3-y}O_4$, $Tb_yNi_{3-y}O_4$, and $Ce_yNi_{3-y}O_4$), wherein y in the general compositions given above represents an integral or non-integral numerical value of at least 0.1 and up to 2; and M' represents one or a combination of metal ions, e.g., $(M'_a, M''_b)_yFe_{3-y}O_4$, wherein subscripts a and b are non-integral numbers that sum to 1 (e.g., $Mn_{0.5}Zn_{0.5}Fe_2O_4$, $Mn_{0.4}Zn_{0.6}Fe_2O_4$, $Ni_{0.5}Co_{0.5}Fe_2O_4$, and $Ni_{0.4}Co_{0.6}Fe_2O_4$).

In particular embodiments of Formula (11), the spinel structure has the composition:

$$M'M''_2O_4 \quad (13)$$

In Formula (13) above, M" is typically a trivalent metal ion and M' is typically a divalent metal ion. More typically, M' and M" independently represent transition metals, and more typically, first row transition metals. Some examples of spinel compositions include $NiCr_2O_4$, $CuCr_2O_4$, $ZnCr_2O_4$, $CdCr_2O_4$, $MnCr_2O_4$, $NiMn_2O_4$, $CuMn_2O_4$, $ZnMn_2O_4$, $CdMn_2O_4$, $NiCo_2O_4$, $CuCo_2O_4$, $ZnCo_2O_4$, $CdCo_2O_4$, $MnCo_2O_4$, $NiFe_2O_4$, $CuFe_2O_4$, $ZnFe_2O_4$, $CdFe_2O_4$, and $MnFe_2O_4$. M' and M" can also be combinations of metals, such as in $(Co, Zn)Cr_2O_4$, and $Ni(Cr, Fe)_2O_4$.

In some embodiments, the metal-containing (non-oxide or oxide) particles produced by the methodology described herein exhibit at least one (or one or more) absorption peaks in the UV-visible-IR range, or one or more photoluminescence emission peaks. In different embodiments, the photoluminescence peak is located at, or at least, or above, or less than 200 nm, 250 nm, 300 nm, 320 nm, 340 nm, 360 nm, 380 nm, 400 nm, 420 nm, 440 nm, 460 nm, 480 nm, 500 nm, 520 nm, 540 nm, 560 nm, 580 nm, 600 nm, 620 nm, 640 nm, 660 nm, 680 nm, 700 nm, 720 nm, 740 nm, 760 nm, 780 nm, 800 nm, 820 nm, 840 nm, 860 nm, 880 nm, 900 nm, 920 nm, 940 nm, 960 nm, 980 nm, 1000 nm, 1020 nm, 1040 nm, 1060 nm, 1080 nm, 1100 nm, 1120 nm, 1140 nm, 1160 nm, 1180 nm, 1200 nm, 1220 nm, 1240 nm, 1260 nm, 1280 nm, 1300 nm, 1320 nm, 1340 nm, 1360 nm, 1380 nm, 1400 nm, 1420 nm, 1440 nm, 1460 nm, 1480 nm, 1500 nm, 1600 nm, 1700 nm, 1800 nm, 1900 nm, 2000 nm, 2500 nm, 3000 nm, 3500 nm, 4000 nm, 4500 nm, or 5000 nm, or within 5 nm, 10 nm, 20 nm, 30 nm, 40 nm, 50 nm, 60 nm, 70 nm, 80 nm, 90 nm, or 100 nm of any of these values, or within a range bounded by any two of these values (e.g., 400-500 nm or 960-980 nm). Some particular ranges considered herein for photoluminescence peaks include 300-500 nm, 300-1500 nm, 500-1000 nm, 500-1500 nm, 435-445 nm, 430-450 nm, 475-525 nm, 1050-1150 nm, 970-980 nm, and 970-1000 nm In some embodiments, the particles exhibit a photoluminescence peak above 500 nm, 800 nm, 1000 nm, 1200 nm, or 1500 nm.

In particular embodiments, the particles possess a photoluminescence peak characterized by a full-width half maximum (FWHM) value of about or less than 20 nanometers (20 nm). In other embodiments, the particles possess a photoluminescence peak characterized by a FWHM value of about or greater than 20 nm. In different embodiments, the particles possess a photoluminescence peak characterized by a FWHM value of about or at least, or above, or less than 20 nm, 40 nm, 60 nm, 80 nm, 100 nm, 150 nm, 200 nm, 250 nm, 300 nm, 350 nm, 400 nm, 450 nm, 500 nm, 600 nm, 700 nm, 800 nm, 900 nm, 1,000 nm, 1,100 nm, and 1,200 nm. In yet other embodiments, the particles possess a photoluminescence peak having a FWHM value of about or less than 15 nm, 10 nm, 8 nm, or 5 nm.

Some other conditions that can affect formation of particles include temperature, reaction time, and precursor metal concentration. The temperature of the reaction (i.e., of the aqueous solution during particle growth) can be, for example, about, at least, above, up to, or less than −10° C., −5° C., 0° C., 15° C., 20° C., 25° C., 30° C., 40° C., 45° C., 50° C., 55° C., 60° C., 65° C., 70° C., 75° C., 80° C., 85° C., 90° C., or 100° C., or a temperature within a range bounded by any two of the foregoing exemplary temperatures, wherein the term "about", used for the temperature, generally indicates within ±5, ±4, ±3, ±2, or ±1° C. of the indicated temperature. In some embodiments, the temperature is maintained at a particular temperature during the course of particle synthesis. By maintaining the temperature is generally meant that the temperature during the course of particle synthesis does not vary by more than ±10%, 5%, or 1%. In some embodiments, the process is conducted at room or ambient temperature, which is typically a temperature of 18-30° C., more typically 20-25° C., or about 22° C.

The reaction (incubation) time is the period of time that the combined reaction components are subjected to reaction conditions necessary for producing particles. The reaction time is very much dependent on the other conditions used, as well as the characteristics desired in the particle product. For example, shorter reaction times (e.g., 1-60 minutes) may be used at elevated temperature conditions whereas longer reaction times (e.g., 1-7 days, or 1-3 weeks) may be used at lower temperatures to obtain a similar yield of product. Typically, shorter reaction times produce smaller particles than particles produced using longer reaction times under the same conditions. The incubation may be, for example, between 3 and 30 days, depending on the amount and size of the particle product desired.

In addition to selecting reaction conditions (e.g., temperature, reaction time, and pH) on the basis of permitting or inducing the formation of particles, the reaction conditions can also be selected for numerous other purposes, including to modify or optimize the product yield, production efficiency, particle size or size range, particle composition or phase (e.g., crystalline vs. semicrystalline vs. amorphous), or particle morphology. For example, lower reaction temperatures may be employed to provide a more pure or single-crystalline product.

Once the particles are produced, they are isolated (i.e., separated) from the reaction components and byproducts formed by the reaction products. Any method known in the art for separation of particles from reaction components can be used herein.

In one embodiment, the particles are separated from the reaction medium by allowing the particles to settle to the bottom of the container and then decanting the liquid medium or filtering off the particles. This settling may be accomplished with or without centrifugation. When centrifugation is used, the centrifugal (i.e., "g" force) causes settling of denser particles to the bottom or distal end of the spun containers. The collected particles may be washed one or more times to further purify the product. The reaction container may optionally be fitted with a drain valve to allow the solid product to be removed without decanting the medium or breaking gas seals.

In another embodiment, the container in which the aqueous solution is housed is attached to (or includes) an external trap from which the particles can be removed. The trap is preferably in the form of a recess situated below flowing reaction solution. Particles in the flowing reaction solution are denser than the reaction solution, and hence, will settle down into the trap. The flowing reaction solution is preferably recirculated.

In another embodiment, a filter is used to trap the produced particles. The filter can be in the form of multiple filters that trap successively smaller particles. Depending on the particle size and other variables, one or more filters that trap the non-oxide particles may contain a pore size of no more than about 0.5, 0.4, 0.3, 0.25, 0.2, 0.1, or 0.05 μm.

In yet another embodiment, in the case where the produced particles are magnetic, a magnetic source (e.g., electromagnet or other suitable magnetic field-producing device) can be employed to collect the particles. The magnetic source can be used as the sole means of separation, or used in combination with other separation means, such as a trap or filter.

When two or more metals are used as precursors, the molar ratio of metal ions can be adjusted such that a particular molar ratio of metals is provided in the particle product. Typically, the molar ratio of metal ions in the metal component is the molar ratio of metals found in the particle product. However, the molar ratio of metals in the product may, in several embodiments, differ from the molar ratio of metals in the aqueous solution. In a particular embodiment, a desired molar ratio of metals is achieved in the particle product by suitable adjustment of metal ratios in the aqueous solution.

One or more dopant species may or may not be included in the aqueous solution in order to dope the resulting particles. The dopant can be any metal or non-metal species, such as any of the metal and non-metal species described above. In some embodiments, the dopant may be or include one or more lanthanide elements, such as those selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). Generally, the dopant is present in an amount of less than 0.5 molar percent of the resulting particles, or in different embodiments, less than or up to 0.4, 0.3, 0.2, 0.1, 0.05, 0.02, or 0.01 molar percent of the resulting particles. Some examples of doped compositions include ZnS:Ni, wherein Ni functions as a dopant, as described in, for example, Bang et al., *Advanced Materials*, 20:2599-2603 (2008), $Zn_xCd_{1-x}S$ doped compositions, as described in Wang et al., *Journal of Physical Chemistry C* 112:16754-16758 (2008), and ZnS:Mn and ZnS:Cu compositions, as described in Song et al., *Journal of Physics and Chemistry of Solids*, 69:153-160 (2008). In other embodiments, a dopant is excluded, or alternatively, one or more of any of the generic or specific dopants described above are excluded.

In a first set of embodiments, the method described above is specifically directed to the preparation of particles having a quantum dot composition, which may be a metal chalcogenide composition (e.g., metal sulfide, metal selenide, or metal telluride composition) or a metal pnictide composition (e.g., metal nitride, metal phosphide, metal arsenide, or metal antimonide composition). The method generally involves subjecting an aqueous solution that includes a source of one or more chalcophile metals, an $E_h$-lowering reducing agent, one or more reducible non-metal components (e.g., reducible chalcogen-containing or pnictide-containing substance), and pH adjusting agent, to the above-described favorable conditions for producing metal chalcogenide or metal pnictide particles.

In a second set of embodiments, the method described above is specifically directed to the preparation of particles having a CIGs-type composition. The method generally involves subjecting an aqueous solution that includes Cu ions and at least one type of metal ion selected from In and Ga, an $E_h$-lowering reducing agent, one or more reducible non-metal components (e.g., reducible chalcogen-containing or pnictide-containing substance), and pH adjusting agent, to the above-described favorable conditions for producing CIGs-type particles.

In a third set of embodiments, the method described above is specifically directed to the preparation of particles having a kesterite or thermoelectric composition. The method generally involves subjecting an aqueous solution that includes at least one chalcophile metal and a source of either Sn or Sb metal species, an $E_h$-lowering reducing agent, one or more reducible non-metal components (e.g., reducible chalcogen-containing or pnictide-containing substance), and pH adjusting agent, to the above-described favorable conditions for producing metal-containing particles.

In yet other particular embodiments, the method described above is specifically directed to the preparation of particles having a metal oxide composition. The method generally involves subjecting an aqueous solution that includes at least one reducible metal oxide or hydroxide compound, an $E_h$-lowering reducing agent, and pH adjusting agent, to the above-described favorable conditions for producing metal-containing particles. The reducible metal oxide or hydroxide contains at least one metal capable of being reduced by the reducing agent. The one or more reducible metals can be any of the metals of the Periodic Table of the Elements having this ability. Preferably, the one or more reducible metals are transition metals, i.e., Groups III-XII (scandium through zinc groups). More typically, the one or more reducible metals are first-row transition metals. Some examples of reducible first-row transition metal ions include Sc(III), Ti(IV), V(III), Cr(VI), Cr(III), Mn(VII), Mn(V), Mn(IV), Mn(III), Fe(III), Co(III), Ni(III), and Cu(II).

In one embodiment, the reducible metal oxide component contains a single metal. The reducible metal oxide component can be, for example, an oxide, oxyhydroxide, or hydroxide of any one of the reducible metals described above. In another embodiment, the reducible metal oxide component contains more than one metal. For example, the reducible metal oxide component can be composed of two reducible metals (e.g., Fe(III) and Co(III), or Fe(III) and Cr(VI)), or three reducible metals (e.g., Fe(III), Co(III), and Cr(VI)), or a reducible metal and a non-reducible metal (e.g., Fe(III) and Zn(II), or Ti(IV) and Al(III), or U(VI) and Fe(II), or Fe(II) and Fe(III)), or two or more reducible metals and a non-reducible metal, or a reducible metal and two or more non-reducible metals, or two or more reducible metals and two or more non-reducible metals. As used herein, the term "non-reducible metal" is a metal not capable of being reduced chemically from an aqueous solution under a given set of conditions. Some examples of non-reducible metals include the alkali metals (e.g., $Li^+$, $Na^+$, and $K^+$), alkaline earth metals (e.g., $Mg^{2+}$, $Ca^{2+}$, and $Sr^{2+}$), main group elements (e.g., cations of Group IIIA-VIIA of the Periodic Table, such as $B^{3+}$ and $Al^{3+}$), and lower oxidation state transition metals (e.g., $Ti^{2+}$, $V^{2+}$, $Cr^{2+}$, $Mn^{2+}$, $Fe^{2+}$, $Co^{2+}$, $Ni^{2+}$, and $Zn^{2+}$).

In a particular embodiment, the reducible metal oxide component includes one or more Fe(III)-containing compounds or materials. Some examples of Fe(III)-containing compounds or materials include the iron(III) halides (e.g., $FeCl_3$), nitrates, hydroxides, oxides, oxidehydroxides (also denoted herein as FeOOH, or Fe(O)OH), tungstates, titanates, chromates, vanadates, silicates, spinels (e.g., the ferrites), and perovskites. The Fe(III)-containing compound or material can also include a mixed-valence (e.g., Fe(II)-Fe(III)) portion. In particular, the Fe(III) oxidehydroxides can be any forms of these materials known in the art, e.g., goethite (α-FeOOH), akageneite (α-FeOOH), lepidocrocite (γ-FeOOH), ferrihydrite ($Fe_5HO_8 \cdot 4H_2O$ or $5Fe_2O_3 \cdot 9H_2O$), Schwertmannite ($Fe_8O_8(OH)_6(SO_4) \cdot nH_2O$ or $Fe^{3+}_{16}O_{16}(OH,SO_4)_{12-13} \cdot 10\text{-}12H_2O$), or green rusts (e.g., $Fe^{III}_xFe^{II}_y(OH)_{3x+2y-z}(A^-)_z$; where $A^-$ is $Cl^-$ or $0.5\ SO_4^{2-}$), or a modified form or combination thereof. The Fe(III) oxides are typically accordingly to the general formula $Fe_2O_3$ (generally, hematite), and can be in any crystalline or amorphous phase thereof. Some examples of hematite phases include α-$Fe_2O_3$ (hematite proper), β-$Fe_2O_3$, γ-$Fe_2O_3$ (maghemite), and ∈-$Fe_2O_3$.

When one or more non-reducible metal species are included in the precursor composition, they typically become incorporated into the final metal oxide particle to some extent. Typically, the non-reducible metal species are included in the same weight or molar basis as provided in the aqueous composition.

In other embodiments, particles having an elemental metal composition are produced by subjecting an aqueous solution that includes at least one reducible metal (i.e., reducible metal salt), an $E_h$-lowering reducing agent, and pH adjusting agent, to the above-described favorable conditions for producing metal-containing particles. The aqueous solution may optionally include one or more reducible non-metal components under conditions where they do not incorporate chalcogen or pnictogen elements, but may have an advantageous effect on the nucleation rate and/or particle growth kinetics. The one or more reducible metals may be selected from, for example, Cu, Pd, Pt, Rh, Ir, Ag, Au, and combinations thereof. For example, an aqueous solution containing a cupric or cuprous halide or sulfate can be reduced to copper nanoparticles by judicious selection of reducing agent, pH, temperature, and reducible non-metal component, if included.

The soluble organic content of the aqueous medium may also be suitably adjusted to provide particles of improved purity. It has herein been found that reducing the organic content of the aqueous solution provides particles with a substantially reduced level of organic contaminants, as can be further evidenced by, for example, infrared spectrum analysis of the nanoparticles. In different embodiments, the soluble organic content of the aqueous medium is selected to be up to or less than, for example, 1 g/L, 0.5 g/L, 0.4 g/L, 0.3 g/L, 0.2 g/L, 0.1 g/L, or 0.05 g/L.

The concentration of the metal-containing component (i.e., "metal salt") in the aqueous solution can be any suitable concentration. For example, in different embodiments, the metal salt concentration is at least, above, up to, or less than, for example, 10 nM, 50 nM, 100 nM, 500 nM, 1 μM, 10 μM, 100 μM, 500 μM, 1 mM, 2 mM, 5 mM, 10 mM, 20 mM, 30 mM, 40 mM, 50 mM, 100 mM, 500 mM, 1M, 2 M, or 5M, or up to the saturation concentration of one or more metal salts, or the metal salt concentration is within a range bounded by any two of the above exemplary values.

In some embodiments, the concentration of the metal-containing component (e.g., $ZnCl_2$, $CdCl_2$, $CuCl$, or $CuCl_2$) can be suitably adjusted to make a desired adjustment in the yield and/or size of the resulting nanoparticles. In a first set of embodiments, a selection in metal salt concentration can result in a yield of at least or above, for example, 20%, 30%, 40%, 50%, 60%, 70%, 75%, 80%, 85%, 90%, 95%, or 98%. In a second set of embodiments, a selection in metal salt concentration can desirably result in a nanoparticle average or uniform size of, for example, 1, 2, 5, 10, 15, 20, 25, 30, 35, 40, 45, or 50 nm, or a size within a range bounded by any two of the foregoing values.

Moreover, the concentration of metal salt in the aqueous solution can be provided all at once (i.e., impact dosing) or by two or more aliquots to achieve a final concentration (i.e., discrete dosing). An example of discrete dosing is an increase of 5 mM concentration of one or more metal salts per day to reach a final concentration of 25 mM over five days. In some embodiments, it has herein been surprisingly found that discrete dosing to a final concentration provides an increase in particle yield over a process in which the final concentration is provided at once (with all other conditions the same). The discrete dosing may also modify or shift the particle size (e.g., to larger or smaller particles) or the particle morphology (e.g., amorphous or crystalline). Successive doses in a discrete dosing process are typically separated by at least 1 hour. In different embodiments, successive doses in a discrete dosing process are separated by precisely, about, at least, more than, or up to, for example, 1, 2, 4, 6, 12, 18, 24, 36, 48, 60, 72, 84, 96, 108, 120, 132, or 144 hours, or within a time frame bounded by any two of the foregoing values, to achieve a final concentration that may be any of the exemplary concentrations provided above. The metal salt is typically dosed into an aqueous solution containing the reducing agent, pH adjusting agent, and optionally, a reducible non-metal component.

In particular embodiments, metal sulfide nanoparticles are produced by reacting a metal salt with a complex of cysteine and an alkali sulfide (e.g., sodium sulfide), herein also designated as "Cys-S" (wherein the cysteine can be considered to be a reducible non-metal component and the alkali sulfide a reducing agent). In the complex, the cysteine can be considered to be a reducing agent and the alkali sulfide a reducible non-metal component. The Cys-S complex can include any suitable molar ratio of the alkali sulfide to cysteine. For example, in different embodiments, the molar ratio of the alkali sulfide to cysteine may be precisely, about, at least, above, up to, or less than 100:1, 50:1, 25:1, 10:1, 5:1, 2:1, 1.5:1, 1:1, 1:1.5, 1:2, 1:5, or 1:10, or a molar ratio within a range bounded by any two of the foregoing ratios. In the process, the pH is preferably carefully controlled to be maintained at any of the pHs described above, while the metal salt is discretely dosed into a Cys-S solution of desired concentration and molar ratio. The foregoing process can be extended to production of metal selenide and metal telluride nanoparticles by, for example, replacing cysteine with a Se- or Te-substituted cysteine or other amino acid, or with a Se- or Te-substituted nucleobase or other selenium-containing or tellurium-containing compound described above.

In other aspects, the invention is directed to a method for forming a component of a device that incorporates any of the above-described metal-containing particles. In particular embodiments, the particles are deposited onto a substrate (by, for example, spray-coating, dip-coating, spin-coating, drop-casting, or inkjet printing the substrate with a solution or suspension containing the metal-containing particles), the coated substrate is typically dried and annealed, and optionally overlaid with a sealant or functional overlayer. In some embodiments, an ink-jet spraying process is used in which multiple ink-jet heads spray a multiplicity of different particle compositions. Ink jet spraying methods, particularly as used in producing patterned surfaces, are described in detail in, for example, U.S. Pat. Nos. 7,572,651, 6,506,438, 6,087, 196, 6,080,606, 7,615,111, 7,655,161, and 7,445,731, the contents of which are incorporated herein by reference in their entirety. In other embodiments, an ultrasonic or sonospray coating process is used. The sonospray method is described in detail in, for example, U.S. Pat. Nos. 4,153,201, 4,337,896, 4,541,564, 4,978,067, 5,219,120, 7,712,680, as well as J. Kester, et al., CP394, *NREL/SNL PV Prog. Rev.*, pp. 162-169, AIP Press, NY, 1997, the contents of which are herein incorporated by reference in their entirety. The sonospray method is a non-vacuum deposition method amenable to the manufacture of large area films, along with low processing costs. In brief, the sonospray method employs an ultrasonic nozzle that operates by use of a piezoelectric transducer that produces a high frequency motion when subjected to a high frequency electrical signal. The high frequency vibration produced by the piezoelectric material travels down a horn of the nozzle. Liquid emerging from the surface of the horn is broken into a fine spray, which is highly controllable with respect to droplet size and distribution. The deposition temperature can be any suitable temperature, but particularly for temperature-sensitive substrates, such as plastics, the deposition temperature is preferably up to or less than 200, 180, 150, 120, 100, or 80° C.

In some embodiments, a multi-layer (e.g., bilayer, trilayer, etc.) coating is provided on a substrate by, for example, depositing a first layer of metal-containing particles (with optional post-annealing, fixing, or sealing), and then depositing a subsequent coating of metal-containing particles of the same or different composition. The number of coatings may be two, three, or more successive coatings.

Moreover, the single layer or multilayer being deposited may be patterned by methods known in the art (e.g., by lithographic techniques) to produce a more sophisticated electronic or photonic device. In a first set of embodiments, a patterned structure is produced by producing an initial patterned layer of metal-containing particles, such as provided by a selective deposition process, such as ink jet printing or sonospray techniques. A patterned multilayer structure may be produced by, for example, producing a patterned first layer, as above, and then depositing a second patterned layer of metal-containing particles. Successive (e.g., third, fourth, and higher numbers) of layers may be similarly deposited. Alternatively, a first deposited layer is not patterned, while a second deposited layer is patterned, and vice-versa.

The substrate can be useful for any applicable electronic or photonic device, such as a display, photovoltaic device (e.g., solar cell), electrode, sensor, optoelectronic device, phosphor, or electronic chip. In a first set of embodiments, the substrate is a metal substrate. Some examples of metal substrates include those composed exclusively of, or an alloy of copper, cobalt, nickel, zinc, palladium, platinum, gold, ruthenium, molybdenum, tantalum, rhodium, or stainless steel. In a second set of embodiments, the substrate is a semiconductor substrate. Some examples of semiconductor substrates include those composed exclusively of, or an alloy of silicon, germanium, indium, or tin, or an oxide, sulfide, selenide, telluride, nitride, phosphide, arsenide, or antimonide of any of these or other metals, such as of copper, zinc, or cadmium, including any of the metal oxide, metal chalcogenide, and metal pnictide compositions described above. In a third set of embodiments, the substrate is a dielectric substrate. Some general examples of dielectric substrates include ceramics, glasses, plastics, and polymers. The substrate may also have a combination of materials (e.g., metal and/or semiconductor components, along with a dielectric component). Some of these substrates, such as molybdenum-coated glass and flexible plastic or polymeric film, are particularly considered herein for use in photovoltaic applications. The photovoltaic substrate can be, for example, an absorber layer, emitter layer, or transmitter layer useful in a photovoltaic device. Other of these substrates can be used as dielectric or conductive layers in a semiconductor assembly device. Still other of these substrates (e.g., W, Ta, and TaN) may be useful as copper diffusion barrier layers, as particularly used in semiconductor manufacturing. The coating method described herein is particularly advantageous in that it can be practiced on a variety of heat-sensitive substrates (e.g., low-temperature plastic films) without damaging the substrate.

Examples have been set forth below for the purpose of illustration and to describe certain specific embodiments of the invention. However, the scope of this invention is not to be in any way limited by the examples set forth herein.

EXAMPLES

Preparation of ZnS Nanoparticles

ZnS nanoparticles were synthesized by dosing of $ZnCl_2$ precursors in degassed water with Cysteine-S (Cys-S) under careful pH control. All chemicals used (e.g., zinc chloride, L-cysteine, sodium sulfide nonahydrate, hydrochloric acid and sodium hydroxide) were of analytical grade and were used without further purification. Water was used as a solvent in the reactions, and was degassed by boiling and cooling under nitrogen gas, dispensed into pressure tubes, serum bottles, and culture bottles anaerobically, sealed, and then sterilized in an autoclave. Cys-S complexes with tailored ratios were prepared by adding sodium sulfide of 250 mM concentration into L-cysteine solution (dissolved in degassed water) at concentrations of 5 mM, 25 mM, 50 mM, and 250 mM, and then stored under nitrogen gas.

The synthesis of ZnS nanocrystals was performed by adding Cys-S of 6 mM concentration followed by $ZnCl_2$ of 5 mM concentration into the degassed water at room temperature. Cys-S with a selected ratio was employed, and the solution was carefully controlled to be at a pH of 6.1 by adding diluted hydrochloric acid solution, as appropriate. The concentration of the added Cys-S solution was based on the concentration of sodium sulfide. The reaction time was 120 hours (5 days).

An experimental study was undertaken to determine any effect of discrete dosing on the yield of ZnS nanoparticles. The experiment was initiated by injecting $ZnCl_2$ of 5 mM concentration into the Cys-S solution of 16 mM concentration. The aliquot of $ZnCl_2$ of 5 mM concentration was dosed every 24 hour for five days. The Cys-S complex of 11 mM concentration was additionally inoculated on the fourth day. In all cases, ZnS powders were obtained after several centrifuges in deionized water followed by freeze drying.

By the above methodology, the synthesis of ZnS nanoparticles has been achieved in a low organic carbon medium at a pH value less than 6.6 utilizing low redox conditions poised by cysteine-HCl. Crystallites formed in the low organic medium exhibited slightly larger size, averaging ~10 nm as evidenced by XRD and likely in the ~15 nm range as evidenced by TEM.

FIG. 1 is a photograph showing serum bottles holding ZnS nanoparticles produced at different pH values, i.e., 11.7 (a), 10.8 (b), 8.1 (c), 6.1 (d), and 2.8 (e). The increasing opacity in lower pH evidences a pH-dependent synthesis of ZnS. Of particular interest is the production of ZnS nanoparticles at a pH of less than 6.6 with less than 0.3 g/L of soluble organic carbon. Traditional media had about 9.5 g/L soluble organics. Two serum bottles on the right with pH<6.6 (FIG. 1(d-e)) demonstrated more copious ZnS nanoparticles than serum bottles on the left with pH>7 (FIG. 1(a-c)).

FIG. 2 shows a cleaner FTIR scan for the ZnS nanoparticles produced in low organic media (top) abiotically with $E_h$/pH control in contrast to the numerous organic peaks associated with traditional microbial-based methods for production of ZnS nanoparticles. As shown, it appears that the ZnS nanoparticles produced by the low organic route has both significantly fewer peaks as well as less prominent peaks associated with organics.

Figures 3A, 3B:
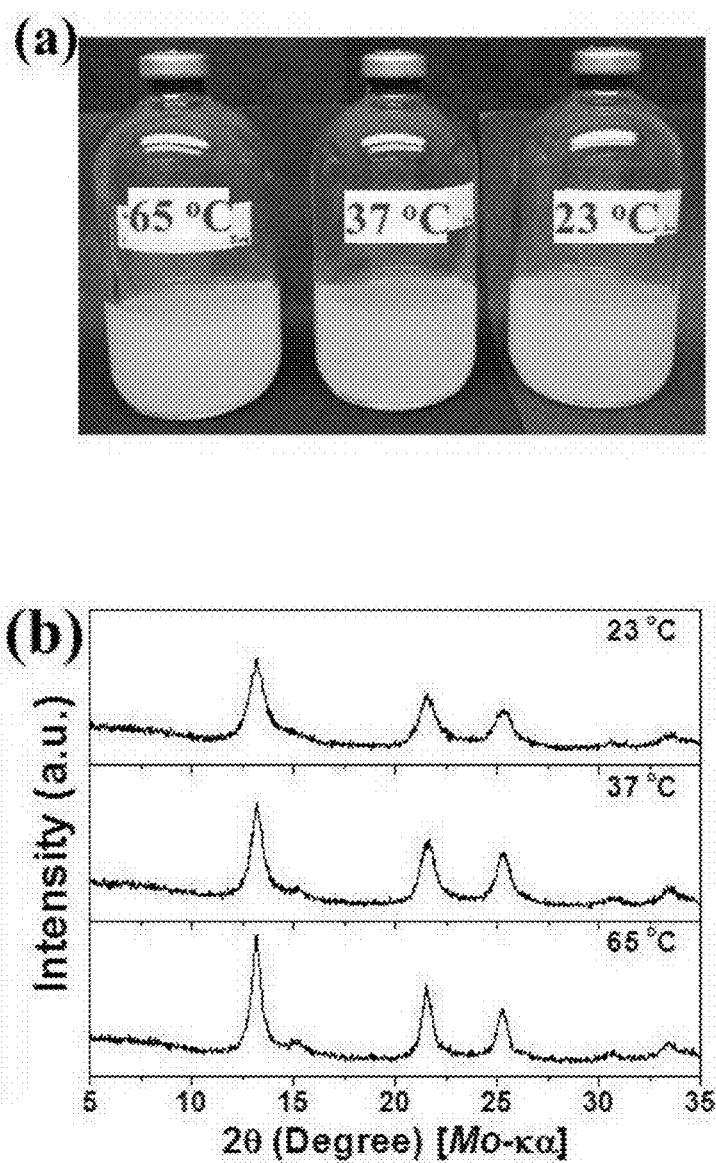
FIGS. 3(a)-(c). Temperature-dependent reactions for the synthesis of ZnS nanoparticles: images of bathes in 50 mL scale (a), X-ray diffraction patterns (b) and temperature-dependent yield and size of ZnS nanoparticles (c).
Figure 3C:
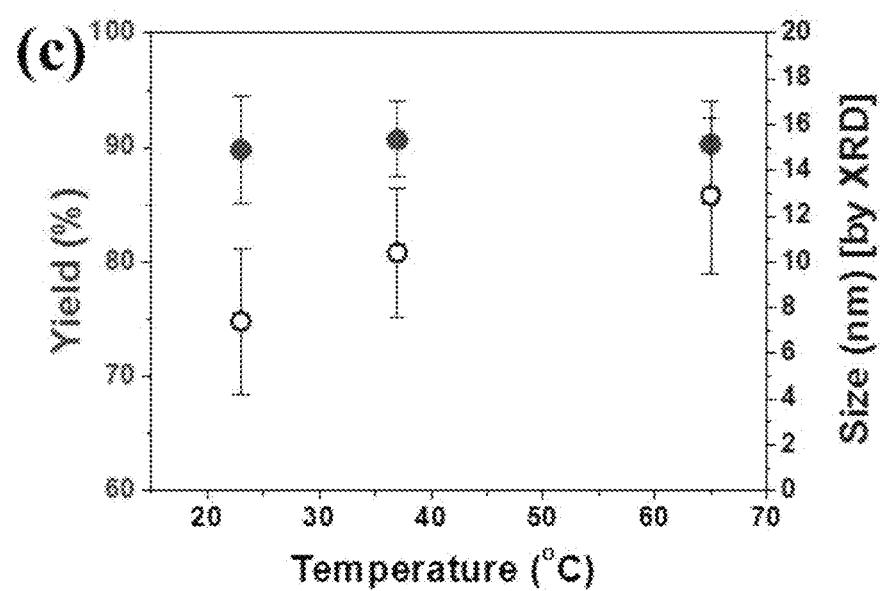
Figures 4A, 4B:
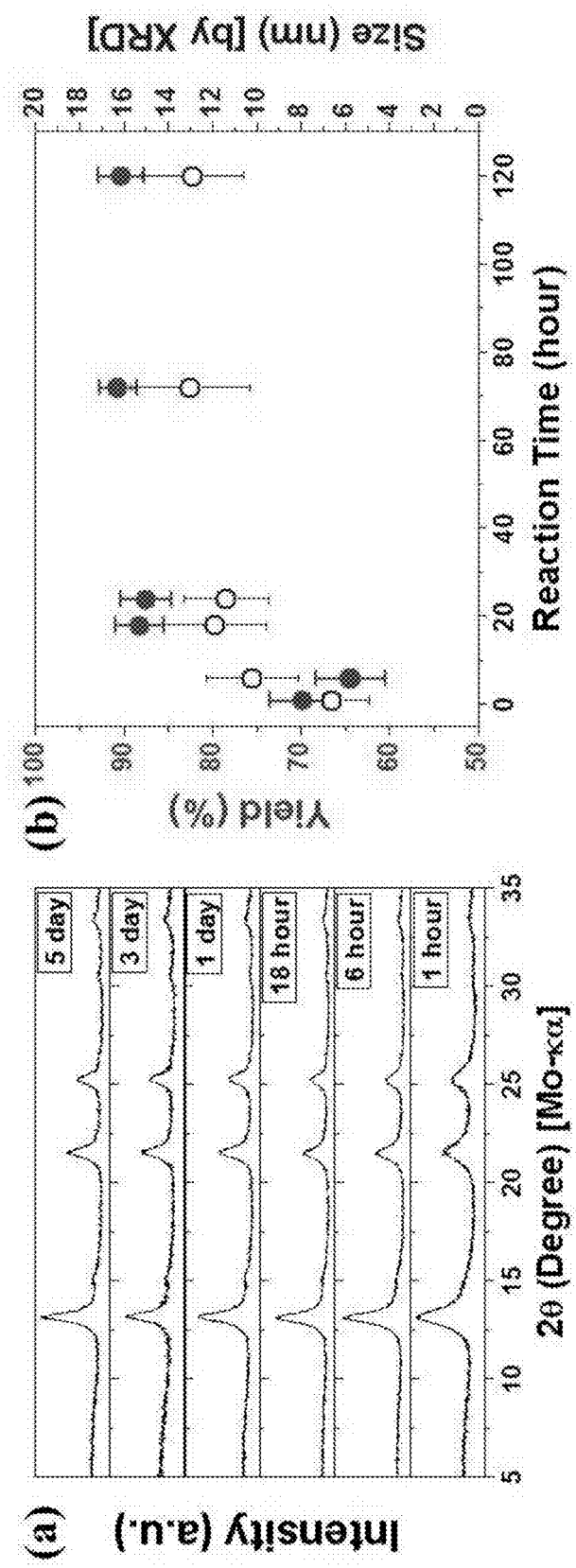
FIGS. 4(a), 4(b). X-ray diffraction patterns (a) and reaction time-dependent yield and ACS (b) of ZnS nanoparticles synthesized by $E_h$/pH control, dependent on reaction time.

As shown in FIG. 3(a), the reactions were conducted at temperatures ranging from room temperature (typically, 20-25° C.) to 65° C. As shown by the XRD pattern of FIG. 3(b), the average crystallite size (ACS) was slightly reduced with decrease in reaction temperature. As shown by the yield vs. temperature plot shown in FIG. 3(c), the yields of ZnS nanoparticles were not dependent on the reaction temperature. The reaction time and the concentration of $ZnCl_2$ precursors in the reactor of the fixed volume have been investigated to enhance the yield. FIGS. 4(a) and 4(b) show the ACS and yields, respectively, of prepared ZnS nanoparticles depending on reaction time, which stabilized after 18 hours.

Figure 5A:
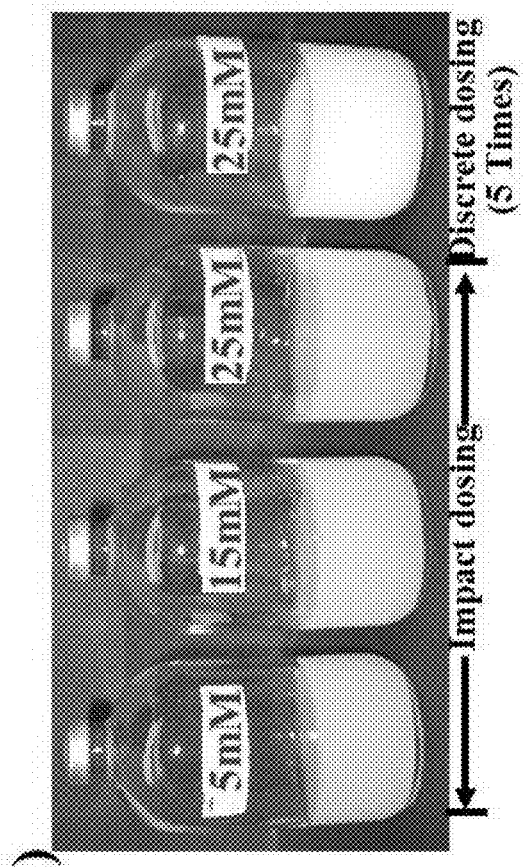
FIGS. 5(a)-(d). ZnS nanoparticle synthesis depending on impact dosing and discrete dosing of $ZnCl_2$ with different concentration: reaction time: images of batches with $ZnCl_2$ of different concentration in 50 mL scale (a), X-ray diffraction patterns (b) concentration-dependent yield (c) and concentration-dependent size (d) of ZnS nanoparticles.
Figure 5B:
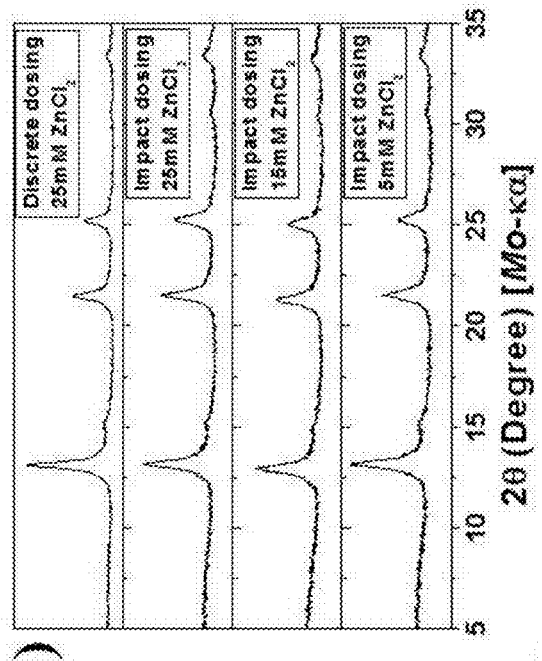
Figures 5C, 5D:
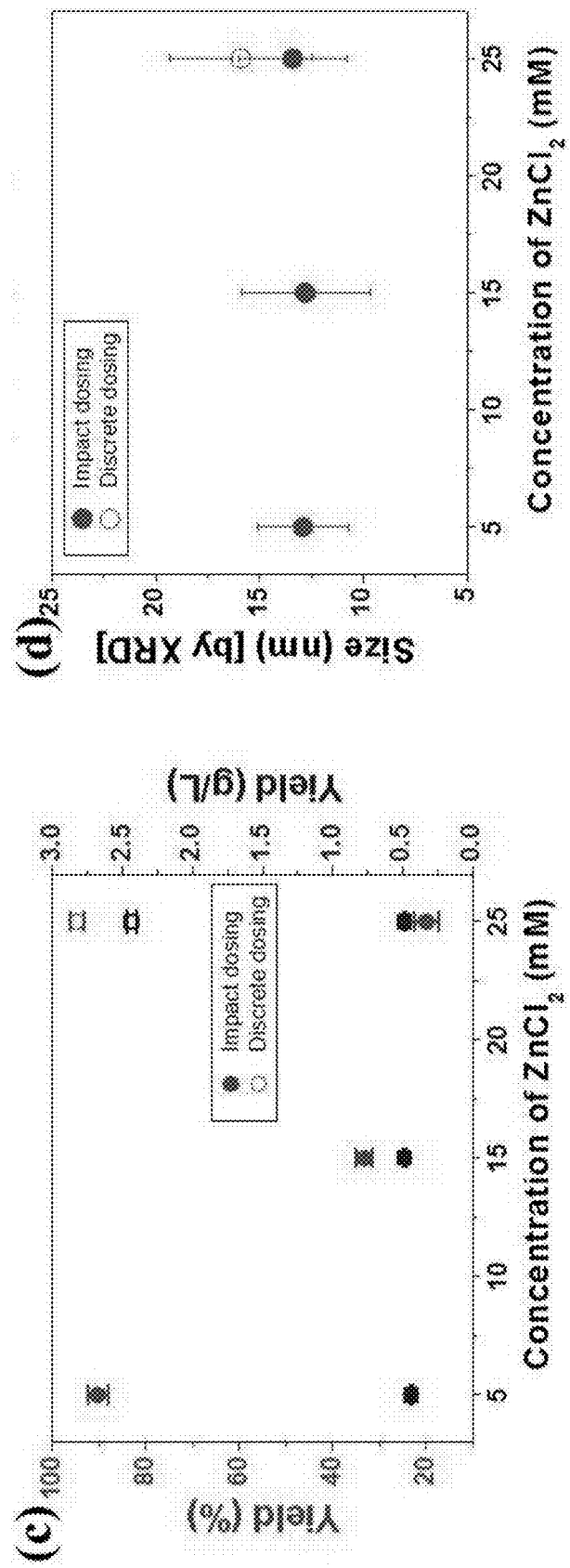

In addition to the reduction of reaction time as an approach to enhance yields, the increase of reactant concentration has been studied. As shown in FIGS. 5(a)-5(d), the concentration of $ZnCl_2$ precursor was varied from 5 mM to 25 mM in a fixed volume of 50 mL. FIG. 5(a) shows images of batches with $ZnCl_2$ of different concentration in 50 mL scale. FIG. 5(b) shows X-ray diffraction patterns for ZnS particles produced from $ZnCl_2$ precursor varied in concentration from 5 mM to 25 mM. FIG. 5(c) is a plot of yield of ZnS nanoparticle vs. concentration of $ZnCl_2$ precursor, i.e., concentration-dependent yield. FIG. 5(d) is a plot of size of ZnS nanoparticle vs. concentration of $ZnCl_2$ precursor, i.e., concentration-dependent size. The discrete dosing of 25 mM $ZnCl_2$ (five times dosing of 5 mM/day based on the previous reaction time study) shows five times increase of yields with slight increase of crystallite size.

Moreover, the ACS of ZnS has been modulated by the control of the ratio of cysteine to $Na_2S$. The Cys-S complex plays a dual role as a reducing agent and a surfactant for the synthesis of ZnS. The ratio of cysteine to $Na_2S$ was varied from 1:1 to 1:50. The ACS of ZnS nanoparticles was characterized by XRD and TEM analysis. The difference in ACS results between TEM and X-ray diffraction may be a result of the broadened peaks provided by the X-ray instrument. The trend of TEM size variation depending on the ratio of cysteine to $Na_2S$ is in agreement with XRD analysis showing a change of average crystallite sizes from 4.2 nm to 10.7 nm.

This described process permits the production of copious quantities of nanoparticles of precise composition and high purity, which, in turn, can advance the production of low cost materials by thin film roll-to-roll processing. Such materials are particularly useful in solid state lighting (SSL) and energy storage applications. The $E_h$/pH production of ZnS has been explored with the size of ZnS nanoparticles controlled by the concentration of reducing agents, which in this case has a dual role as surfactant.

Low temperature reductive production of NPs with nucleation and $E_h$/pH controls for mass producing nanoscale powders has advantages of aqueous processing, high yields, low temperature, scalability, and reproducibility with environmentally friendly production as compared to traditional physical and chemical synthesis methods. The described methods have been demonstrated with certain specific metal sulfides, but is readily applicable to producing other metal sulfides, such as CdS, CuS, and SnS, as well as the analogous selenides, tellurides, arsenides, and other metal and semiconducting nanoparticle compositions.

This instant disclosure describes a new manufacturing approach for crystalline nanostructured metal-containing compositions with controlled particle size with varied stoichiometries, as particularly useful in low-cost solid state lighting, photovoltaic, electronic and energy-related applications. The low temperature process works particularly well from 20-70° C. using standard industrial equipment. By making tailored nanoparticles with novel properties and functionalities in economic quantities, the process broadens the applications for which these nanoparticles could be integrated.

Metal-containing nanoparticles, particularly semiconductors, are of interest for applications in electronic, display, chemical, and energy industries. Various physical, chemical, solution, and biological processes have been developed for the synthesis of such nanoparticles to exploit their size dependent properties. Existing methodologies have restrictions related to issues of complex reactions and toxic chemistries, high cost of material development, scalability of processing equipment, high energy consumption, high temperature of manufacturing, low production rate, or requiring the use of biological catalysts or nucleators. These restrictive issues make large scale production difficult and pose a major impediment of nanoparticles use in industry. Low temperature reductive production of nanoparticles with nucleation and $E_h$/pH controls for mass producing nanoscale powders has the advantages of aqueous processing, high yields, low temperature, scalability, and reproducibility with environmentally friendly production as compared to traditional physical and chemical synthesis methods.

While there have been shown and described what are at present considered the preferred embodiments of the invention, those skilled in the art may make various changes and modifications which remain within the scope of the invention defined by the appended claims.

What is claimed is:

1. A method for abiotically producing non-oxide metal chalcogenide particles, the method comprising subjecting an aqueous solution comprising: (i) a metal-containing component containing at least one chalcophilic metal; (ii) an adduct of cysteine or Se- or Te-analog thereof with a reduced sulfide, reduced selenide, or reduced telluride; (iii) pH adjusting agent; and (iv) water to reductive abiotic conditions, and maintaining the $E_h$ value of the solution by controlling the pH of said aqueous solution within the bounds of an $E_h$-pH stability field corresponding to the composition of the non-oxide metal chalcogenide particles to be produced, and producing said non-oxide metal chalcogenide particles under said reductive abiotic conditions in said aqueous solution at a selected $E_h$ value within the bounds of said $E_h$-pH stability field.

2. The method of claim 1, wherein said $E_h$ is less than 200 mV and above −400 mV.

3. The method of claim 1, wherein said chalcophilic metal is selected from the group consisting of cationic forms of Sc, Ti, V, Cr, Mn, Fe, Co, Ni, Cu, Zn, Y, Zr, Nb, Hf, Ta, Cd, Mo, W, Ag, Pd, Pt, Ga, In, Tl, Ge, Sn, Pb, Sb, Bi and combinations thereof.

4. The method of claim 1, wherein said chalcophilic metal is selected from the group consisting of cationic forms of Cd, Cu, Fe, Ga, In, Sn, and Zn.

5. The method of claim 1, wherein said non-oxide metal chalcogenide particles have a quantum dot composition selected from the group consisting of ZnX', CdX', CuX', and SnX' compositions, wherein X' is selected from the group consisting of S, Se, Te, and combinations thereof.

6. The method of claim 1, wherein said non-oxide metal chalcogenide particles have a composition of the formula:

$$Cu(In_xGa_{1-x})X'_2 \qquad (2)$$

wherein x is an integral or non-integral numerical value of or greater than 0 and less than or equal to 1, and X' is selected from the group consisting of S, Se, Te, and combinations thereof.

7. The method of claim 1, wherein said non-oxide metal chalcogenide particles have a composition of the formula:

$$M_3SnX'_4 \qquad (4)$$

wherein M represents at least one chalcophile metal other than Sn, and X' is selected from the group consisting of S, Se, Te, and combinations thereof.

8. The method of claim 7, wherein M is selected from the group consisting of Cu, Fe, Zn, Cd, and combinations thereof.

9. The method of claim 1, wherein said aqueous solution further comprises a surface-active agent that interacts by coordinate bonds to surfaces of the non-oxide metal chalcogenide particles.

10. The method of claim 1, wherein said aqueous solution is adjusted in pH to suitably lower the $E_h$ to be within the bounds of the $E_h$-pH stability field corresponding to the composition of the non-oxide metal chalcogenide particles to be produced.

11. The method of claim 1, wherein said non-oxide metal chalcogenide particles possess a size within a range of 2 nm to 100 nm.

12. The method of claim 1, wherein said non-oxide metal chalcogenide particles possess a size of less than 50 nm.

13. The method of claim 1, wherein said non-oxide metal chalcogenide particles possess a size of up to 20 nm.

14. The method of claim 1, wherein the aqueous solution is maintained at a temperature of up to 70° C. during production of the non-oxide metal chalcogenide particles.

* * * * *